US012613833B1

(12) United States Patent
Ahmadi et al.

(10) Patent No.: US 12,613,833 B1
(45) Date of Patent: Apr. 28, 2026

(54) CLUSTERING AT INGEST TIME

(71) Applicant: Snowflake Inc., Bozeman, MT (US)

(72) Inventors: Hossein Ahmadi, Seattle, WA (US);
Varun Ganesh, San Bruno, CA (US);
Ganeshan Ramachandran Iyer,
Redmond, WA (US); Tyler Jones,
Redwood City, CA (US); Kevin Ali Li,
Burlingame, CA (US); Hitesh Madan,
Seattle, WA (US); Ismail Oukid, Berlin
(DE); Alkin Sen, Redwood City, CA
(US); Ryan Michael Thomas Shelly,
San Francisco, CA (US)

(73) Assignee: Snowflake Inc., Bozeman, MT (US)

( * ) Notice: Subject to any disclaimer, the term of this
patent is extended or adjusted under 35
U.S.C. 154(b) by 0 days.

(21) Appl. No.: 19/223,923

(22) Filed: May 30, 2025

(51) Int. Cl.
*G06F 16/00* (2019.01)
*G06F 16/11* (2019.01)
*G06F 16/14* (2019.01)
*G06F 16/16* (2019.01)

(52) U.S. Cl.
CPC ............ *G06F 16/16* (2019.01); *G06F 16/116*
(2019.01); *G06F 16/144* (2019.01)

(58) Field of Classification Search
None
See application file for complete search history.

(56) References Cited

U.S. PATENT DOCUMENTS 12,062,368 B1 * 8/2024 Arora ................... G10L 15/1822
2024/0111718 A1 * 4/2024 McNutt ................. G06F 16/148

FOREIGN PATENT DOCUMENTS

CN 115516425 A * 12/2022 ......... G06F 9/45558

OTHER PUBLICATIONS

"Apache Iceberg", The open table format for analytic datasets,
[Online] Retrieved from the internethttps iceberg.apache.org , 8 pgs.
"Introducing Tableflow", Unifying Streaming and Analytics, [Online]
Retrieved from the internethttps www.confluent.ioblog introducing-
tableflow , 15 pgs.
"Filter messages from a subscription", Pub Sub Documentation |
Google Cloud, [Online] Retrieved from the internethttps docs.cloud.
google.com pubsub docs subscription-message-filter, 8 pgs.
(Continued)

*Primary Examiner* — Tuankhanh D Phan
(74) *Attorney, Agent, or Firm* — Schwegman Lundberg &
Woessner, P.A.

(57) ABSTRACT
A system and method for optimizing data ingestion through
clustering during the copy process. The system detects a data
processing pipeline definition with a COPY command and
determines storage location and destination table param-
eters. Upon detecting a COPY command, the system parses
the command syntax to identify storage location and desti-
nation table parameters. The system monitors for available
file batches at the storage location and executes the COPY
command to transform these batches into formatted files
compatible with the destination table format. The system
then performs clustering operations on the formatted files,
organizing data according to pre-defined clustering keys,
before ingesting the clustered files into the destination table.

25 Claims, 15 Drawing Sheets

1400 ⟍

DETECT A DATA PROCESSING PIPELINE DEFINITION INCLUDES A COPY COMMAND SYNTAX — 1402

PARSE THE COPY COMMAND SYNTAX TO DETERMINE A STORAGE LOCATION AND A DESTINATION TABLE — 1404

DETECT A BATCH OF FILES IS AVAILABLE AT THE STORAGE LOCATION — 1406

EXECUTE THE COPY COMMAND TO TRANSFORM THE BATCH INTO FORMATTED FILES ASSOCIATED WITH A PRE-CONFIGURED FILE FORMAT COMPATIBLE WITH THE DESTINATION TABLE — 1408

PERFORM CLUSTERING ON THE FORMATTED FILES TO GENERATE CLUSTERED FILES — 1410

INGEST THE CLUSTERED FILES IN THE DESTINATION TABLE — 1412

(56) References Cited

OTHER PUBLICATIONS

"Understand event filtering for Event Grid subscriptions", Event filtering for Azure Event Grid—Azure Event Grid | Microsoft Learn, [Online] Retrieved from the internethttps learn.microsoft. com en-us azure event-grid event-filtering, 21 pgs.
"Configuring event notifications using object key name filtering", Amazon Simple Storage Service, https docs.aws.amazon.com AmazonS3 latest userguide notification-how-to-filtering.html, 9 pgs.
"Azure Government documentation", Microsoft Learn, [Online] Retrieved from the internethttps learn.microsoft.comen-us azure azure-government , 3 pgs.
"Amazon S3 in AWS GovCloud US", [Online] Retrieved from the internethttps docs.aws.amazon.com govcloud-uslatest UserGuide govcloud-s3.html, 5 pgs.
"Snowflake Ingest SDK", Maven Repository, [Online] Retrieved from the internethttps mvnrepository.com artifact net.snowflake snowflake-ingest-sdk, 4 pgs.

* cited by examiner

| id | name | country | date |
|----|------|---------|------|
| 2 | A | UK | 11/2 |
| 4 | C | SP | 11/2 |
| 3 | C | DE | 11/2 |
| 2 | B | DE | 11/2 |
| 3 | A | FR | 11/2 |
| 2 | C | SP | 11/2 |
| 3 | Z | DE | 11/2 |
| 2 | B | UK | 11/2 |
| 4 | C | NL | 11/2 |
| 5 | X | FR | 11/3 |
| 1 | A | NL | 11/3 |
| 5 | A | FR | 11/3 |
| 2 | X | FR | 11/2 |
| 4 | Z | NL | 11/2 |
| 2 | Y | SP | 11/2 |
| 1 | B | SP | 11/3 |
| 5 | X | DE | 11/3 |
| 3 | A | UK | 11/4 |
| 1 | C | FR | 11/3 |
| 4 | Z | NL | 11/4 |
| 5 | Y | SP | 11/4 |
| 5 | B | SP | 11/5 |
| 3 | X | DE | 11/5 |
| 2 | Z | UK | 11/5 |

```
CREATE [ OR REPLACE ] PIPE <PIPE_NAME>
AS
COPY INTO TABLE <TABLE_NAME>
FROM
(
    SELECT <STMT>
    FROM TABLE(DATA_SOURCE TYPE => 'STREAMING'))
)
[ CLUSTER_AT_INGEST_TIME = TRUE ]
```

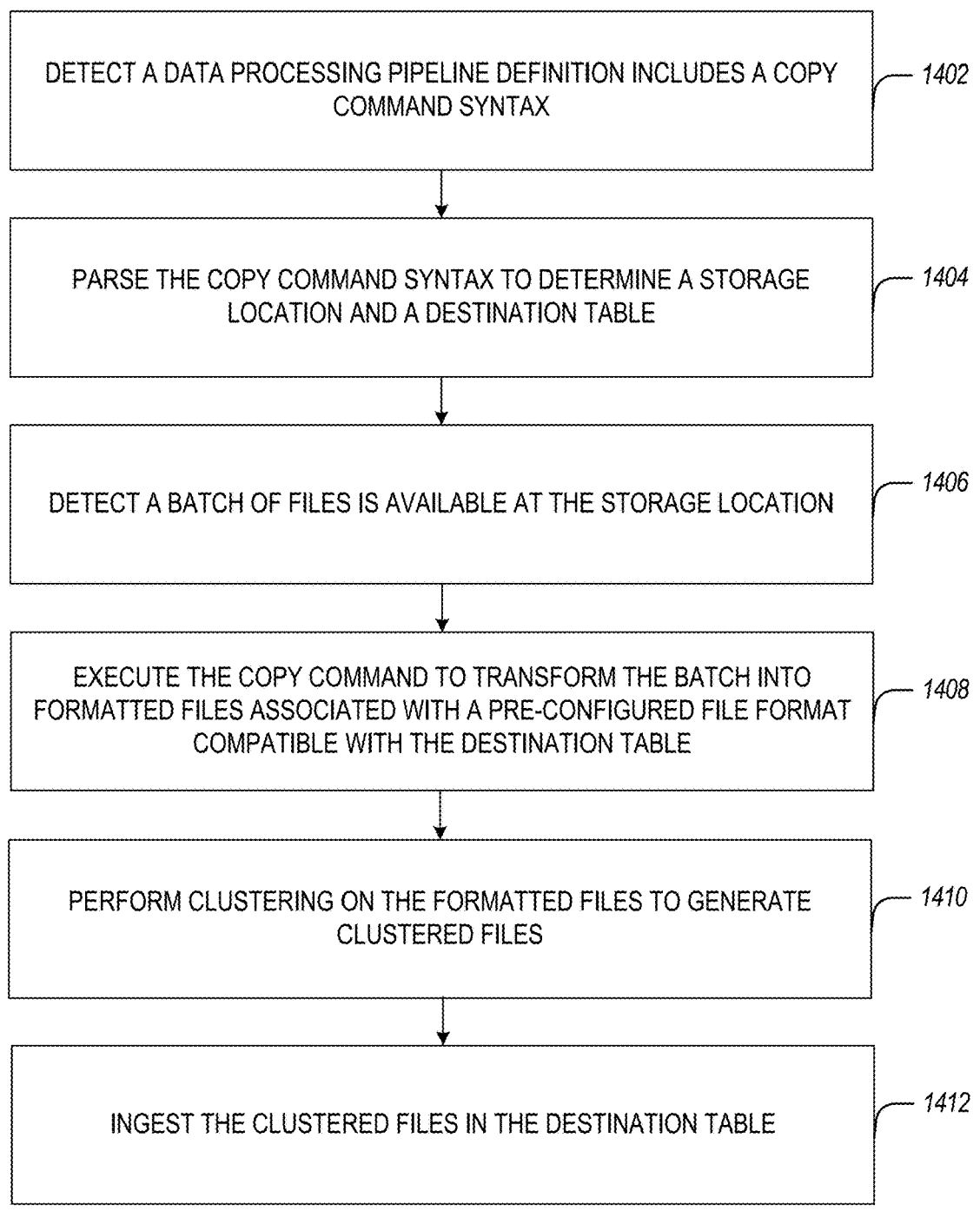

DETECT A DATA PROCESSING PIPELINE DEFINITION INCLUDES A COPY COMMAND SYNTAX — 1402

PARSE THE COPY COMMAND SYNTAX TO DETERMINE A STORAGE LOCATION AND A DESTINATION TABLE — 1404

DETECT A BATCH OF FILES IS AVAILABLE AT THE STORAGE LOCATION — 1406

EXECUTE THE COPY COMMAND TO TRANSFORM THE BATCH INTO FORMATTED FILES ASSOCIATED WITH A PRE-CONFIGURED FILE FORMAT COMPATIBLE WITH THE DESTINATION TABLE — 1408

PERFORM CLUSTERING ON THE FORMATTED FILES TO GENERATE CLUSTERED FILES — 1410

INGEST THE CLUSTERED FILES IN THE DESTINATION TABLE — 1412

FIG. 14

CLUSTERING AT INGEST TIME

TECHNICAL FIELD

Embodiments of the disclosure relate generally to databases and, more specifically, to a data processing service performing data clustering at ingest time.

BACKGROUND

Databases are widely used for data storage and access in computing applications. A goal of database storage is to provide enormous amounts of information in an organized manner so that it can be accessed, managed, updated, and shared. In a database, data may be organized into rows, columns, and tables. Different database storage systems may be used to store different types of content, such as bibliographic, full text, numeric, and image content. Further, in computing, different database systems may be classified according to the organizational approach of the database. There are many different types of databases, including relational databases, distributed databases, cloud databases, object-oriented databases, and others.

Various entities and companies use databases to store information that may need to be accessed or analyzed. When a query is generated to extract certain organized information from the database, a query statement is executed against the database data. The query returns specific data according to one or more query predicates that indicate what information should be returned by the query. The query extracts specific data from the database and formats that data into a readable form. The query may be written in a language that is understood by the database, such as Structured Query Language ("SQL"), so the database systems can determine what data should be located and how it should be returned. The query may request any pertinent information that is stored within the database. If the appropriate data can be found to respond to the query, the database has the potential to reveal complex trends and activities. This power can be harnessed through the use of a successfully executed query on ingested data. However, the configuration and execution of queries on ingested data may be challenging and time-consuming.

BRIEF DESCRIPTION OF THE DRAWINGS

The present disclosure will be understood more fully from the detailed description given below and from the accompanying drawings of various embodiments of the disclosure.

FIG. 5 is a diagram illustrating a simplified view of how partition overlap affects the clustering ratio for a table, in accordance with some embodiments of the present disclosure.

FIG. 11 is a diagram of an example data processing service definition configuring a data processing service to perform clustering at ingest time using a COPY command, in accordance with some embodiments of the present disclosure.

FIG. 14 is a flow diagram illustrating the operations of a database system in performing a method for ingesting data into a destination table, in accordance with some embodiments of the present disclosure.

DETAILED DESCRIPTION

Figure 1:
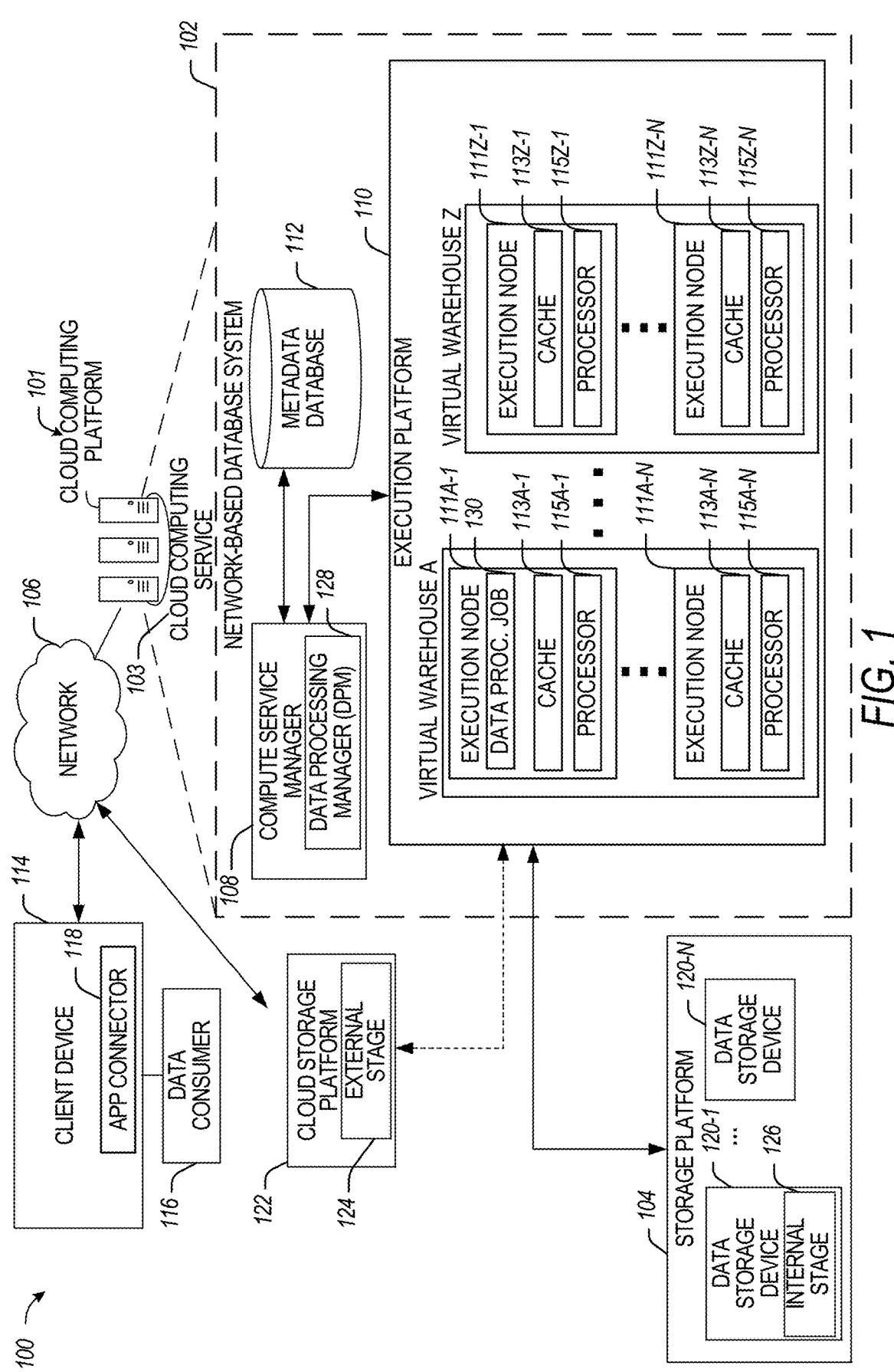
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

A database table (also referred to as a table) can be defined as a collection of records (or rows). Each record contains a collection of values of table attributes (or columns). Tables can be physically stored in multiple smaller (varying size or fixed size) storage units, e.g., files or blocks. These files or blocks may be part of different partitions of the table. The term "partitioning" can be defined as physically separating records with different data to separate data partitions. For example, a table can partition data based on the date attribute (or column), resulting in "per day" partitions, or based on the country attribute (or column), resulting in a "per country" partition.

In some aspects, database systems can use partitioning to split large tables into manageable chunks of data. The ability to eliminate partitions (or partition pruning) can be based on predicates specified by the query, may result in a dramatic reduction of the input/output (IO) volume, and can be essential to maintain the acceptable performance of those systems.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and the like. If stored internally in the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, extensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other examples of unstructured-file types, semi-structured-file types, and structured-file types, as well as example uses thereof, could certainly be listed here as well, and will be familiar to those of skill in the relevant arts. Different people of skill in the relevant arts may classify types of files differently among these categories and may use one or more different categories instead of or in addition to one or more of these.

As used herein, the term "processing pipe" (also referred to as "pipe" or "pipeline") indicates a functionality to support continuous processing of an abstract discrete item (e.g., a record in a KAFKA topic, a step in a multi-step workflow, or any other unit of work that can be processed independently and can be considered a discrete item). In some aspects, the term "processing pipe" indicates a data processing service that can be used to ingest data and configure the processing of one or more tasks associated with the data. In this regard, the terms "pipe," "pipeline," and "data processing service" (or DPS) can be used interchangeably. As used herein, the term "slot" indicates a compute resource unit for a compute node (e.g., a processor core or another compute resource).

In some aspects, a database table can be partitioned as manually specified by a database administrator. For example, the administrator may provide the number of partitions and/or the partitioning keys. However, in order to manually specify these details, the administrator needs to have a good understanding of the query workload to select the correct partitioning keys. Also, the number of partitioning keys is typically limited as it directly translates into a fragmentation of the physical storage. Additionally, maintaining partitions is typically very expensive in terms of computational power and time.

A related concept to partitioning is clustering or ordering. Ordering (using a set of ordering key attributes or columns) orders the data (e.g., in a database table) according to the values of these key attributes. Clustering may be defined as physically grouping records (or rows) (e.g., in partitions) that have values that are close together. For example, rows sharing the same keys may be put next to each other (or in the same partition). Ordering according to a set of keys is one approach to achieve clustering based on those keys. The values sharing the same key may be next to each other, but the groups sharing the same key or close keys do not need to be adjacent. In some aspects, the term "ordering" can be used where the terms or concepts of "clustering" or "partial ordering" could also be applied. These concepts differ from partitioning as they do not introduce separate physical entities (e.g., it is possible to order data for the entire table or within a part of the table).

Reclustering of a database table is a process that reorganizes the physical layout of data in the table to improve query performance (e.g., read a partition from a table, sort the partition, and write the partition back to a table). In some aspects, reclustering can be made available as a Data Manipulation Language (DML) statement that a user account can invoke manually. A database system may provide specific functions for computing metrics, exposing how well clustered a table is, and may further provide a current recommended practice for the client account to manually invoke such a function to determine when and how much of a database table should be reclustered. A user may follow this practice of manually reclustering one or more database tables and achieve satisfactory clustering overall, but this requires significant diligence and attention from the user. Manual reclustering of a database table can require considerable tuning and may be time-consuming to implement. To keep up with ongoing DML operations, users may need to run reclustering from time to time. The effectiveness of manual reclustering is often limited by resources, such as the size of a virtual warehouse configured to perform the clustering operation. Additionally, manually re-clustering operations may block client DML operations such as delete, update, and merge operations.

In some aspects, clustering (or reclustering) of table data (e.g., data in database table partitions) results in delayed processing due to data skew (e.g., difference in partition sizes of partitions in a processing batch of an execution job).

In some aspects, clustering of table data can be configured in terms of batches. As used herein, the term "batch" indicates a set of partitions of a table (e.g., micro-partitions) with overlaps that can be sorted and rewritten independently (e.g., on a single machine or execution node). In some aspects, clustering execution can be scaled by the number of jobs executing a batch, by running on a larger compute warehouse (also referred to as a virtual warehouse), and by running more batches concurrently (e.g., one batch on each execution node in the compute warehouse).

Aspects of the present disclosure provide techniques for data clustering at ingest time by a data processing manager (DPM) of a network-based database system by changing when and how clustering occurs during data ingestion. For example, data ingestion can be initiated via a COPY command that includes a flag (e.g., CLUSTER_AT_INGEST-_TIME flag) indicating whether the data should be clustered at the time it is ingested into a destination table. In this regard, the flag (when enabled), along with table-defined clustering keys, triggers the DPM to perform the clustering process as data is ingested into a destination table. During ingestion, the DPM buffers incoming data until it reaches a target batch size rather than processing individual portions of data. This batched data is then sorted according to pre-configured clustering keys, such as time events, types, or tenants, that are defined in the table. The sorted data is written directly in a destination table format, eliminating the need for intermediate data representations (e.g., intermediate file formats). In some aspects, the DPM can configure the disclosed data ingestion techniques through a modified query plan that includes a sort operator, executed with specific parameters for tables that have auto-clustering enabled.

In some aspects, the disclosed clustering functionality is integrated into both batch file ingestion and streaming data ingestion, allowing for unified handling of different data ingestion scenarios. In some aspects, the DPM can be configured to perform the disclosed techniques in a compute service manager of the network-based database system, which tracks data and manages batch completion, while one or more compute nodes of an execution platform perform the actual computation and clustering operations. In some aspects, DPM can configure safeguards to ensure atomic commits of batched data and proper handling of partial file commits, addressing potential consistency challenges that arise from sorting data during ingestion.

Advantages of the disclosed data ingestion techniques over prior solutions include significantly improved query performance, reduced overall costs, and elimination of the background clustering computation step. Previously, data would land in a destination table in an unoptimized format, requiring background processing to cluster it, leading to poor query performance and higher costs until clustering is complete. However, the disclosed techniques based on clustering at ingest time reduce the total system overhead by eliminating one scan and rewrite operation, as there is no longer a need to read and write intermediate files from the unoptimized (or intermediate) format into the optimized (or final) data format associated with clustered data. In this regard, query performance is enhanced because data is immediately available in a clustered format, allowing for efficient pruning of unnecessary files during queries, which can improve query performance multiple times, depending on the workload. Additionally, the disclosed techniques also address the inefficiency of having "bad data" (e.g., data in an unoptimized format) in tables that previously impacted query performance until background clustering was completed.

The various embodiments that are described herein are described with reference, where appropriate, to one or more of the various figures. An example computing environment using a DPM to configure clustering at ingest time, as well as other data ingestion functions (e.g., configuring data processing pipelines in connection with processing streaming and batch file data), is discussed in connection with FIGS. 1-2. Example clustering configuration functions associated with the DPM are discussed in connection with FIGS. 3-7. Example data ingestion functions, including configuring clustering at ingest time, associated with the DPM, are discussed in connection with FIGS. 8-14. A more detailed discussion of example computing devices that may be used in connection with the disclosed techniques is provided in connection with FIG. 15.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not explicitly described herein. In other embodiments, the computing environment may comprise another type of network-based database system or a cloud data platform. For example, in some aspects, the computing environment 100 may include a cloud computing platform 101 with a network-based database system 102, a storage platform 104, and a storage platform 122 (which can be a cloud storage platform). The cloud computing platform 101 provides computing resources and storage resources that may be acquired (purchased) or leased (e.g., by data providers and data consumers), and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities (e.g., performing the data ingestion functions described herein). The cloud computing platform 101 may include a three-tier architecture: data storage (e.g., storage platforms 104 and 122), an execution platform 110, and a compute service manager 108 providing cloud services (e.g., services associated with configuring clustering at ingest time using DPM 128).

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform, which is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the storage platforms 104 and 122 (e.g., AWS®, Microsoft Azure Blob Storage®, or Google Cloud Storage), client device 114 (e.g., a data provider), and data consumer 116 via network 106. The network-based database system 102 is a network-based system used for reporting and analysis of integrated data from one or more disparate sources, including one or more storage locations within the storage platform 104. The storage platform 104 comprises a plurality of computing machines and provides on-demand computer system resources, such as data storage and computing power, to the network-based database system 102.

The network-based database system 102 comprises a compute service manager 108, an execution platform 110, and at least one metadata database 112. The network-based database system 102 hosts and provides data reporting and analysis services (as well as additional services such as the disclosed DPM-related functions) to multiple client accounts, including an account of the data provider associated with client device 114 and an account of the data consumer 116. In some embodiments, the compute service manager 108 comprises the DPM 128, which can be used in connection with DPM-related functions. Example functions performed by the DPM 128 include clustering during ingestion (e.g., using at least one data processing job 130 configured at the execution platform 110), batch processing management, query optimization, resource management, and integration capabilities. A more detailed description of the functions provided by the DPM 128 is provided in connection with FIGS. 3-14.

The compute service manager 108 coordinates and manages operations of the network-based database system 102. The compute service manager 108 also performs query optimization and compilation and manages clusters of computing services that provide compute resources (also referred to as "virtual warehouses"). The compute service manager 108 can support any number of client accounts, such as end-users providing data storage and retrieval requests, accounts of data providers, accounts of data consumers, system administrators managing the systems and methods described herein, and other components/devices that interact with the compute service manager 108.

The compute service manager 108 is also in communication with a client device 114. The client device 114 corresponds to a user of one of the multiple client accounts (e.g., a data provider) supported by the network-based database system 102. The data provider may utilize application connector 118 at the client device 114 to submit data storage, retrieval, and analysis requests to the compute service manager 108 as well as to access or configure other services provided by the compute service manager 108 (e.g., services associated with the disclosed data ingestion functions).

Client device 114 (also referred to as user device) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device 114 operated by such users. For example, a notification to a user may be understood to be a notification transmitted to the client device 114, input or instruction from a user may be understood to be received by way of the client device 114, and interaction with an interface by a user shall be understood to be interaction with the interface on the client device 114. In addition, database operations (joining, aggregating, analyzing, etc.) ascribed to a user (consumer or provider) shall be understood to include performing such actions by the cloud computing service 103 in response to an instruction from that user.

In some aspects, a data consumer 116 can communicate with the client device 114 to access functions offered by the data provider. Additionally, the data consumer 116 can access functions (e.g., data ingestion functions) offered by the network-based database system 102 via the network 106.

The compute service manager 108 is also coupled to at least one metadata database 112 that stores metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the storage platform 104) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources (e.g., execution nodes) that execute, for example, various data storage, data retrieval, and data processing tasks. The execution platform 110 is coupled to storage platform 104 and storage platform 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data storage technology. Additionally, the storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on the storage platform 122.

As shown in FIG. 1, the execution platform 110 includes a plurality of virtual warehouses, such as virtual warehouses A, . . . , Z. Each virtual warehouse includes multiple execution nodes, with each node including a data cache and a processor. For example, as shown in FIG. 1, virtual warehouse A includes execution nodes 111A-1 to 111A-N; execution node 111A-1 includes a cache 113A-1 and a processor 115A-1; and execution node 111A-N includes a cache 113A-N and a processor 115A-N. Similarly, in this example, virtual warehouse Z includes execution nodes 111Z-1 to 111Z-N; execution node 111Z-1 includes a cache 113Z-1 and a processor 115Z-1; and execution node 111Z-N includes a cache 113Z-N and a processor 115Z-N.

Each execution node of the execution platform 110 is assigned to process one or more data storage and/or data retrieval tasks. Hence, the virtual warehouses can execute multiple tasks in parallel, utilizing the multiple execution nodes. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

In some examples, the execution nodes of the execution platform 110 are stateless with respect to the data that the execution nodes are caching. That is, the execution nodes do not store or otherwise maintain state information about the execution node or the data being cached by a particular execution node in these examples. Thus, in the event of an execution node failure, the failed node can be transparently replaced by another node. Since there is no state information associated with the failed execution node, the new (replacement) execution node can easily replace the failed node without concern for recreating a particular state.

The execution platform 110 may include any number of virtual warehouses. Additionally, the number of virtual warehouses in the execution platform 110 is dynamic, such that new virtual warehouses are created when additional processing and/or caching resources are needed. Similarly, existing virtual warehouses may be deleted when the resources associated with the virtual warehouse are no longer necessary.

Although each virtual warehouse shown in FIG. 1 includes N execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary. Additionally, although the execution nodes shown in the example of FIG. 1 each include a single data cache and a single processor, in other examples, execution nodes can contain any number of processors and any number of caches. Also, the caches may vary in size among the different execution nodes.

In some examples, the virtual warehouses of the execution platform 110 operate on the same data, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, which is helpful for tasks that require fast scanning of large amounts of data. In some embodiments, the cache resources and computing resources associated with a particular execution node are determined when the execution node is created based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses A, . . . , Z are illustrated with an association with the same execution platform 110, the virtual warehouses may be implemented using multiple computing systems at multiple geographic locations. For example, virtual warehouse A can be implemented by a computing system at a first geographic location, while virtual warehouse Z is implemented by another computing system at a second geographic location. In some examples, these different computing systems are cloud-based computing systems maintained by one or more entities.

Execution platform 110 is also fault-tolerant. For example, if one virtual warehouse fails, it is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the storage platform 104, but each virtual warehouse has its own execution nodes with independent processing and caching resources. This configuration allows requests on different virtual warehouses to be processed independently and with no interference between the requests. This independent processing, combined with the ability to add and remove virtual warehouses dynamically, supports the addition of new processing capacity for new users without impacting the performance observed by the existing users.

In some embodiments, communication links between elements of the computing environment 100 are implemented via one or more data communication networks, such as network 106. The one or more data communication networks may utilize any communication protocol and any communication medium. In some embodiments, the data communication networks are a combination of two or more data communication networks (or sub-networks) coupled with one another. In alternate embodiments, these communication links are implemented using any communication medium and any communication protocol.

The compute service manager 108, metadata database 112, execution platform 110, and storage platform 104 are shown in FIG. 1 as individual discrete components. However, each of the compute service manager 108, metadata database 112, execution platform 110, and storage platforms 104 and 122 may be implemented as a distributed system (e.g., distributed across multiple systems/platforms at multiple geographic locations; also referred to as deployments). Additionally, each of the compute service manager 108, metadata database 112, execution platform 110, and storage platforms 104 and 122 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operations, the network-based database system 102 processes multiple jobs as determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the storage platform 104. It is desirable to retrieve as much data as possible from caches within the execution platform 110 because the retrieval speed is typically much faster than retrieving data from the storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the storage platform 104. Thus, the computing resources and cache resources are not restricted to specific data storage devices 120-1 to 120-N. Instead, all computing resources and all cache resources may retrieve data from and store data to any of the data storage resources in the storage platform 104.

Figure 2:
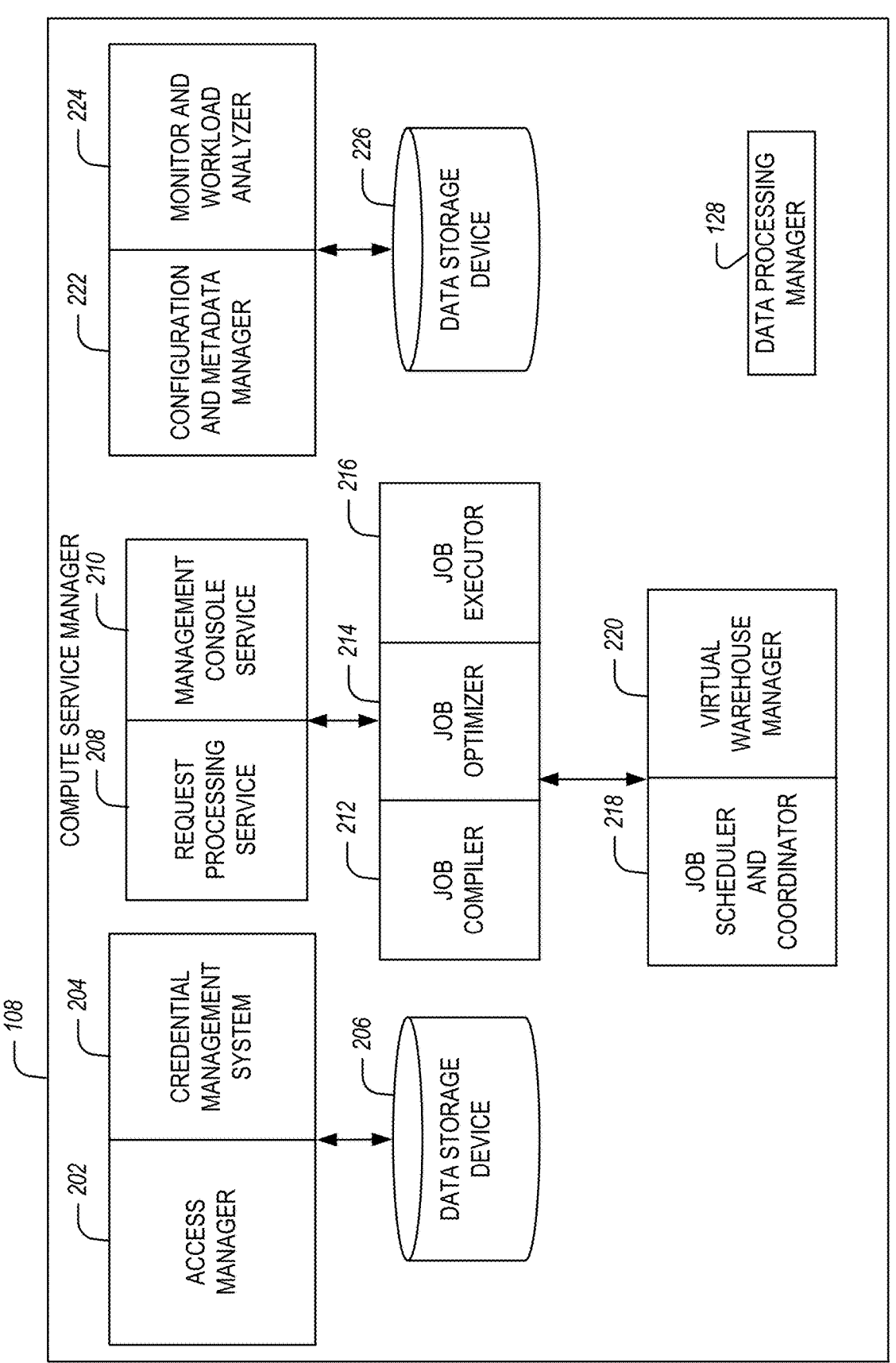
FIG. 2 is a block diagram illustrating the components of a compute service manager using a data processing manager (DPM), in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to a data storage device 206 (which can be an example of the metadata database 112). Access manager 202 handles authentication and authorization tasks for the systems described herein. The credential management system 204 facilitates the use of remotely stored credentials to access external resources, such as data resources, in a remote storage device. As used herein, the remote storage devices may also be referred to as "persistent storage devices" or "shared storage devices." For example, the credential management system 204 may create and maintain remote credential store definitions and credential objects (e.g., in the data storage device 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the data storage device 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in the storage platform 104.

A management console service 210 supports administrators and other system managers' access to various systems and processes. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs, such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and the local buffers (e.g., the buffers in the execution platform 110). Configuration and metadata manager 222 uses metadata to determine which data (e.g., files, row data, etc.) files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data source D (e.g., data storage device 226) that is not relevant to query A. Similarly, a given execution node (e.g., execution node 111A-1 may need to communicate with another execution node (e.g., execution node 111Z-1) and should be disallowed from communicating with a third execution node (e.g., execution node 111Z-N) and any such illicit communication can be recorded (e.g., in a log or other location). Also, the information stored on a given execution node is restricted to data relevant to the current query, and any other data is unusable, rendered so by destruction or encryption where the key is unavailable.

In some embodiments, the compute service manager 108 further includes the DPM 128, which can be used in connection with DPM-related functions disclosed herein, such as clustering during ingestion (e.g., using at least one data processing job 130 configured at the execution platform 110), batch processing management, query optimization, resource management, and integration capabilities.

Figure 3:
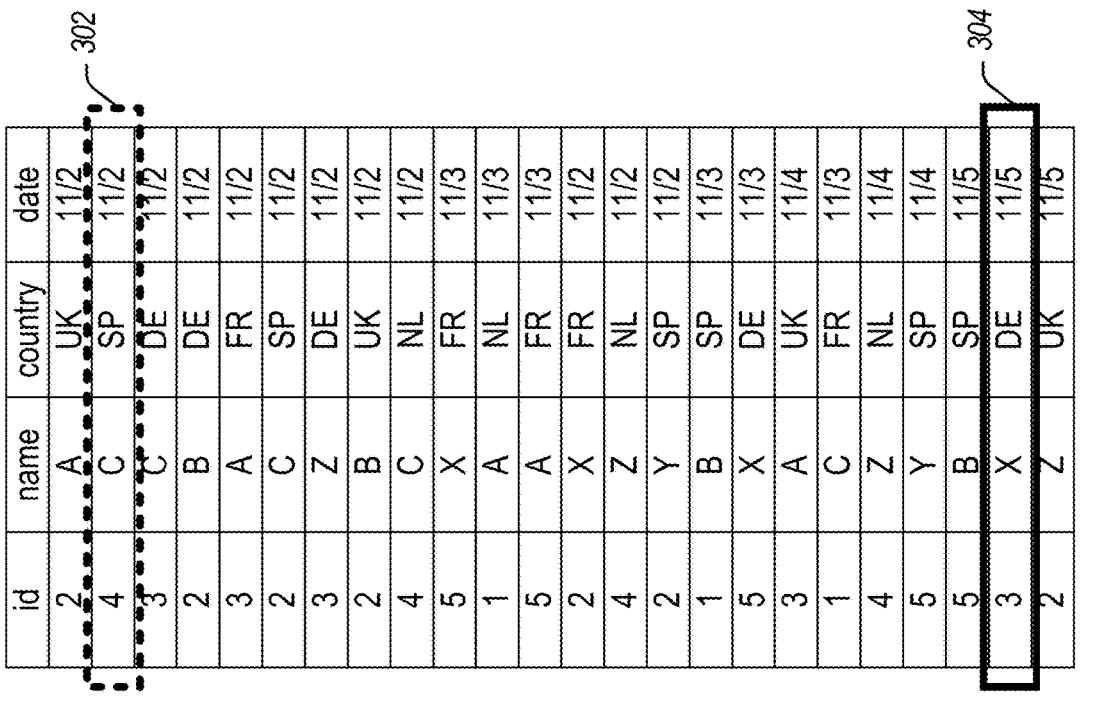
FIG. 3 is a diagram illustrating the logical structure of a database table, in accordance with some embodiments of the present disclosure.
Figure 4:
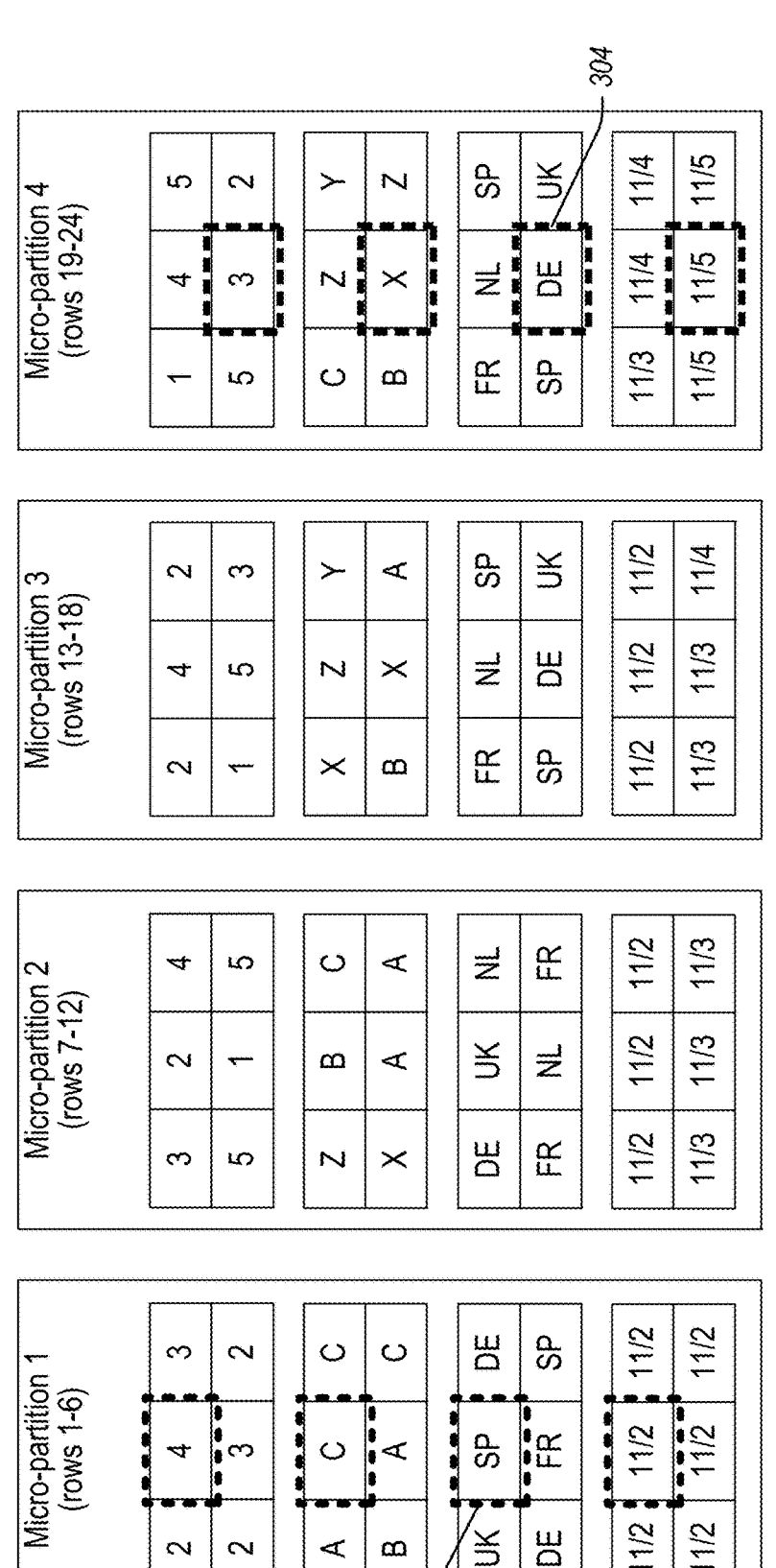
FIG. 4 is a diagram illustrating the physical structure of the database table of FIG. 3 in memory, in accordance with some embodiments of the present disclosure.

FIG. 3 is a diagram illustrating the logical structure of a database table 300, and FIG. 4 is a diagram illustrating the physical structure 400 of the database table of FIG. 3 in memory, in accordance with some embodiments of the present disclosure.

Table 300 has 4 columns naturally sorted (e.g., as received/added) and 24 rows. The data of Table 300 is stored across 4 micro-partitions, shown in the physical structure 400 (in FIG. 4), with the rows divided equally between each micro-partition. Row 2 is shown with a bolded dashed line 302, and row 23 is shown with a bolded solid line 304 in both the logical structure shown in FIG. 3 and the physical structure 400 shown in FIG. 4 to illustrate how they relate.

Within each micro-partition, the data is sorted and stored by the date column, which enables the system to perform the following actions for queries on the table: prune micro-partitions that are not needed for the query and prune by column within the remaining micro-partitions. Even though partitions are sorted by column, the partitions are not necessarily sorted relative to each other, and there is some overlap between partitions (e.g., micro-partitions 1, 2, and 3 all include a 11/2 date).

The configuration and metadata manager 222 maintains clustering metadata for the micro-partitions in a table. The metadata may include one or more of the total number of micro-partitions for a table, the number of micro-partitions containing values that overlap with each other (in a specified subset of table columns), and/or the depth of the overlapping micro-partitions. In one embodiment, these details may be accessed using the following system functions: SYSTEM$CLUSTERING_DEPTH, SYSTEM$CLUSTERING_INFORMATION, and SYSTEM$CLUSTERING_RATIO.

The clustering ratio may be computed based on overlaps of partitions with each other, the average number of partitions that overlap for each value in a column, or other parameters. In one embodiment, the clustering ratio for a table is a number between 0 and 100, which indicates whether the clustering state of the table has improved or deteriorated due to changes to the data in the table. The higher the ratio, the more optimally clustered the table is, with a value of 100 indicating that the table is fully clustered. Clustering ratios can be used for a variety of purposes, including monitoring the clustering "health" of a large table, particularly over time as DML is performed on the table, and/or determining whether a large table would benefit from explicitly defined clustering keys.

The clustering ratio for a table may not be an absolute or precise measure of whether the table is well-clustered. It may be a relative value intended as a guideline for optimizing data storage within a specific table. Clustering ratios may not be helpful for comparisons between tables because every table and data clustering scenario is different, depending on the data characteristics of the table. In other words, if a table has a higher ratio than another table, it does not necessarily indicate that the first table is better clustered than the second table. Ultimately, query performance is often the best indicator of how well-clustered a table is. If queries on a table are performing as needed or expected, the table is likely well-clustered, and subsequent reclustering may not dramatically change the ratio or improve performance. Suppose query performance degrades over time, and there is a corresponding lowering in the clustering ratio for the table. In that case, the table is likely no longer optimally clustered and would benefit from reclustering.

Figure 5:
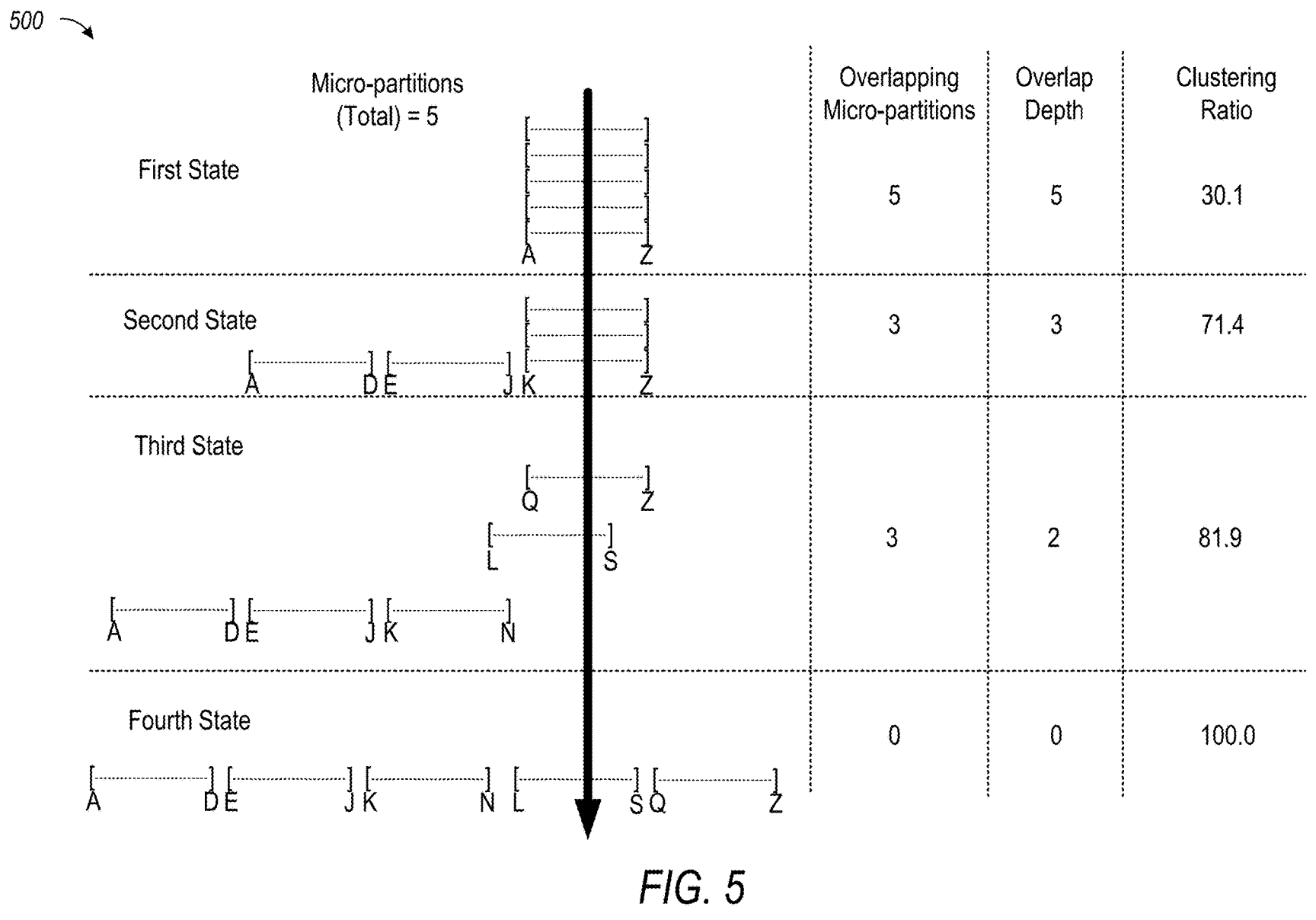

FIG. 5 is a diagram 500 illustrating a simplified view of how partition overlap affects the clustering ratio for a table, in accordance with some embodiments of the present disclosure. Overlap for a table consisting of 5 micro-partitions is illustrated in FIG. 5, at various stages with corresponding statistics for the number of overlapping micro-partitions, overlap depth, and clustering ratio. The table is clustered on a column comprising values ranging from A to Z. In the first state, the ranges of values in all the micro-partitions overlap, and the clustering ratio is low (e.g., 30.1). As the number of overlapping micro-partitions decreases and the overlap depth decreases in the second and third states, the clustering ratio improves (e.g., 71.4 and 81.9, respectively). When there is no overlap in the ranges of values across all micro-partitions, the micro-partitions are considered to be in a constant state (i.e., they cannot be improved by reclustering), and the table has a clustering ratio of 100. In this fourth state, the table is considered to be fully clustered.

Figure 6:
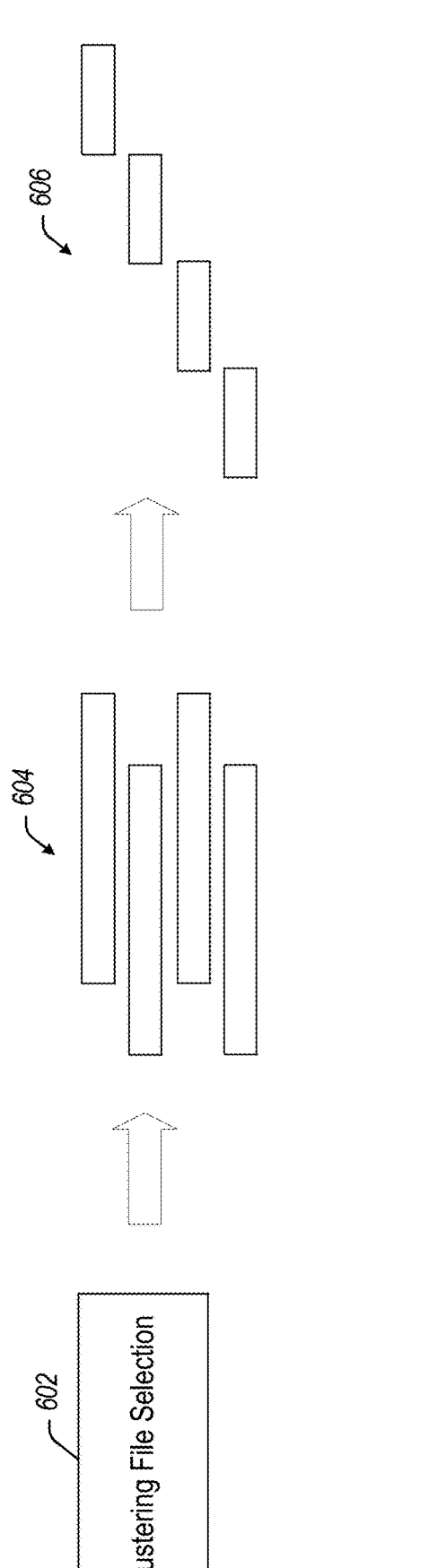
FIG. 6 is a diagram of database table partitions before and after clustering configured by the DPM of FIG. 2, in accordance with some embodiments of the present disclosure.

FIG. 6 is a diagram 600 of database table partitions before and after clustering configured by the DPM of FIG. 2, in accordance with some embodiments of the present disclosure. Referring to FIG. 6, DPM 128 can perform clustering file selection 602, which can include selecting batches of partitions (e.g., partitions associated with a table) for clustering. For example, DPM 128 can perform the clustering file selection 602 in connection with clustering functions to select batch 604. As illustrated in FIG. 6, batch 604 includes four overlapping partitions, which are to be scanned, sorted, and re-inserted into the table. For example, after clustering, the partitions in batch 604 are transformed into non-overlapping partitions 606, which can be re-inserted back into the table.

Figure 7:
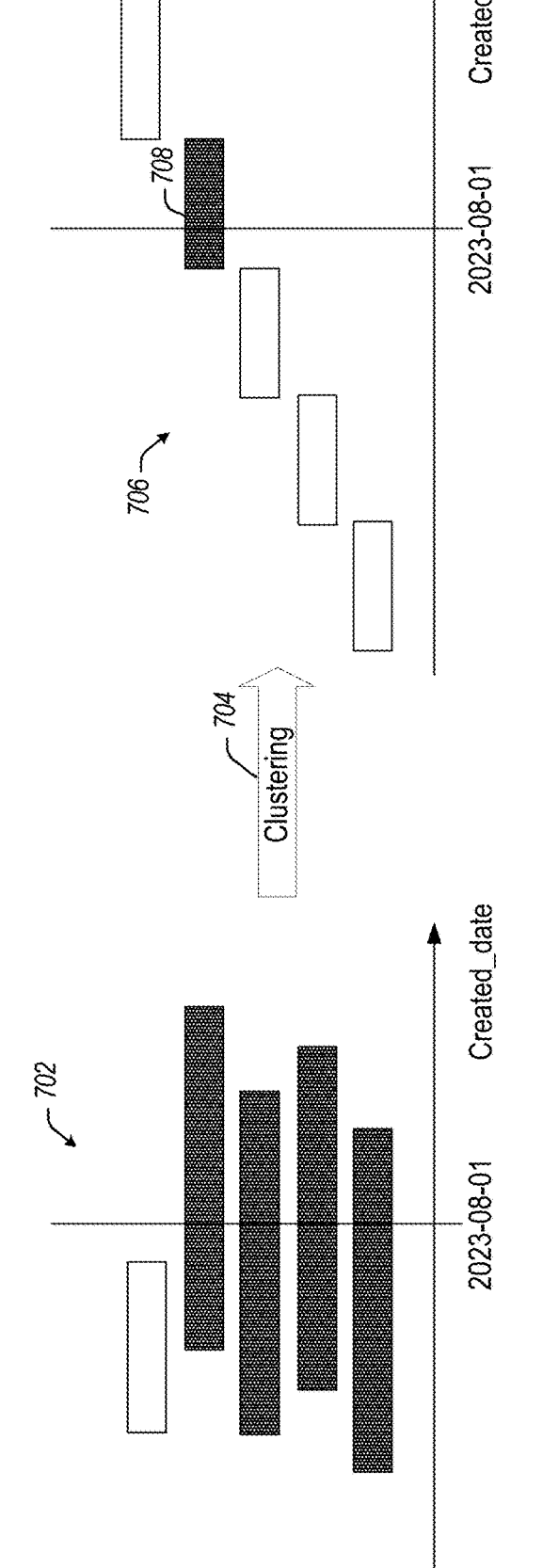
FIG. 7 is a diagram illustrating the transformation of database table partitions during clustering, in accordance with some embodiments of the present disclosure.

Generating non-overlapping partitions by DPM 128 can be beneficial (especially at ingest time) as it results in more efficient query processing (e.g., as illustrated in FIG. 7).

FIG. 7 is a diagram 700 illustrating the transformation of database table partitions during clustering, in accordance with some embodiments of the present disclosure. Referring to FIG. 7, the network-based database system 102 can receive the following query for processing using batch 702: select * from logs where created_date='2023 Aug. 1'. As illustrated in FIG. 7, batch 702 includes multiple overlapping partitions associated with an overlapping date range that includes the queried date of 2023 Aug. 1. DPM 128 can perform clustering 704 (e.g., using the disclosed techniques) to generate clustered partitions 706. After clustering is completed and clustered partitions 706 are re-inserted back into the source table, the query can be processed more efficiently using a single partition 708 that includes the queried date.

Figure 8:
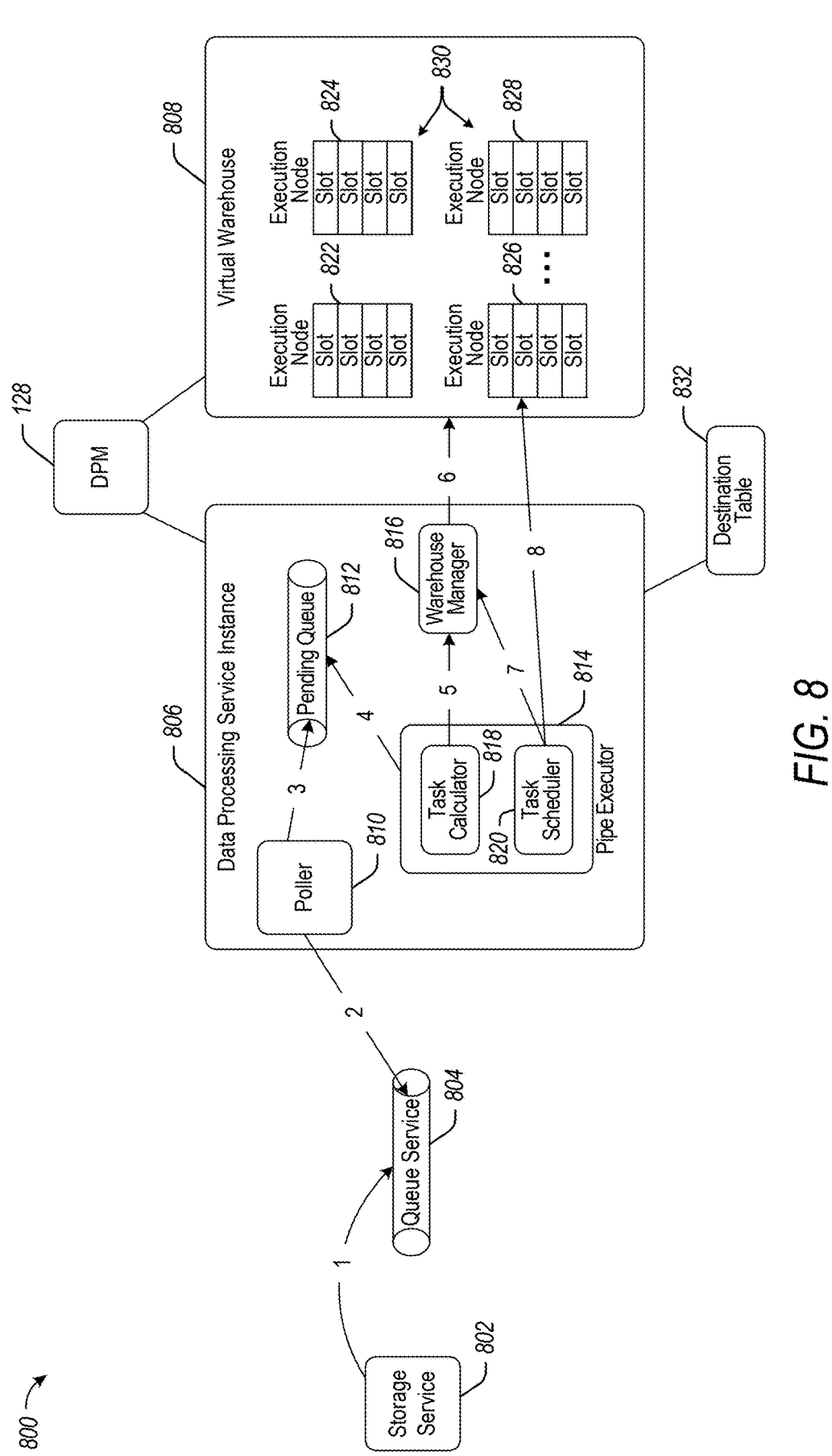
FIG. 8 is a block diagram of a data processing service, in accordance with some embodiments of the present disclosure.

FIG. 8 is a block diagram of a data processing service 800, in accordance with some embodiments of the present disclosure. Referring to FIG. 8, the data processing service 800 includes a storage service 802 (e.g., Amazon S3), a queue service 804 (e.g., Amazon SQS), a data processing service instance 806, and a virtual warehouse 808.

In some aspects, the data processing service instance 806 can be configured as part of the compute service manager 108 and can include a poller 810, a pending queue 812, a pipe executor 814, and a warehouse manager. The pipe executor includes a task calculator 818 and a task scheduler 820.

In some aspects, the virtual warehouse 808 can be any of the virtual warehouses of the execution platform 110 (e.g., as illustrated in FIG. 1). Virtual warehouse 808 can include execution nodes 822, 824, 826, . . . , 828. Each of the execution nodes can be configured with a plurality of slots 830 (e.g., processing cores or other compute resources that can be allocated to individual tasks or processing jobs).

In operation, the storage service 802 sends event notifications for incoming data availability. Incoming data may be persisted as files or stored in a queue (e.g., when Kafka is used). Poller 810 polls the queue service 804 for new event notifications. Poller 810 then forwards valid notifications to the pending queue 812. The pipe executor 814 can review the pending queue 812 and estimate (e.g., using the task calculator 818) a task count associated with one or more workloads stored as files in the pending queue 812. The estimated task count is sent to the warehouse manager 816. The warehouse manager 816 estimates the warehouse size of a virtual warehouse needed to execute the detected tasks (e.g., the estimation can be based on the task count). Virtual warehouse 808 is selected based on the task count. The task scheduler 820 fetches available slots (of execution nodes in the virtual warehouse 808) from the warehouse manager to schedule tasks and schedule the ingestion of the tasks on the available slots.

In some aspects, the disclosed techniques can be used to perform clustering on data held in memory (e.g., in a queue) or persisted to files first that have a reference held in a queue.

In some aspects, DPM 128 can use the data processing service instance 806 to perform clustering at ingest time (e.g., clustering during data ingestion resulting in clustered data being stored in a destination table 832), batch processing management, query optimization, resource management, and integration capabilities.

For example, DPM 128 can perform clustering at ingest time based on buffering a batch of incoming data until reaching a target size, sorting data according to pre-configured clustering keys defined in the definition of the destination table 832, and writing the sorted data directly (e.g., in a pre-configured format) in the destination table 832 and bypassing intermediate data representation. In some aspects, DPM 128 can enable clustering at ingest time through a COPY command flag (e.g., a CLUSTER_AT_INGEST-_TIME flag).

A more detailed description of the disclosed DPM functions for performing clustering at ingest time is provided below in connection with FIGS. 12-13.

Figure 9:
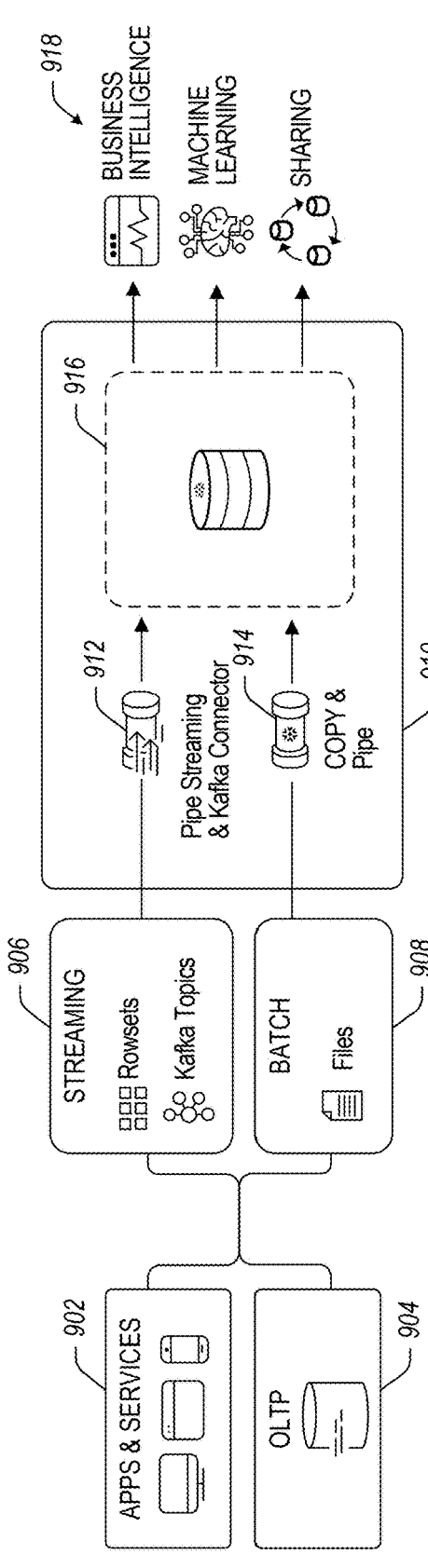
FIG. 9 is a block diagram of a data processing service configured to process streaming and batch file data, in accordance with some embodiments of the present disclosure.

FIG. 9 is a block diagram 900 of a data processing service configured to process streaming and batch file data, in accordance with some embodiments of the present disclosure. Referring to FIG. 9, a network-based database system 102 uses a data processing system 910 to process streaming data 906 and batch file data 908 received from applications/services 902 or online transaction processing (OTP) 904.

In some aspects, DPM 128 configures the data processing system 910 with a data processing service instance 916, which receives the streaming data 906 and batch file data 908 via corresponding connectors 912 and 914. The ingested data can be pre-processed (e.g., can be clustered at ingest time using the disclosed techniques) and stored in one or more destination tables as output. The output data can be consumed by one or more data-consuming services 918.

In some aspects, DPM 128 configures connector 912 to provide the streaming data 906 as rowsets, with variable arrival frequency (e.g., via the appendRows( ) command) to achieve ordered ingestion within a channel.

In some aspects, DPM 128 configures connector 914 to use a COPY command for ingesting and processing (e.g., clustering at ingest time) the batch file data 908. In some aspects, connector 914 performs the ingestion of batch file data as auto-scaled ingestion, including deduplication with file tracking.

In some aspects, connector 914 is used for batch file ingestion where data is staged as files in storage, and a background process reads this data to ingest it into a pre-configured file format (e.g., a file format compatible with a destination table) or an open-file format like Iceberg.

In some aspects, the disclosed techniques can be used to configure clustering at ingest time, which includes transforming (e.g., clustering) the data based on a pipe definition and ingesting the transformed data into the destination table. In this regard, by committing the data in a clustered format for tables with defined clustering keys, downstream processing and transformation of data after it has been ingested can be avoided.

Figure 10:
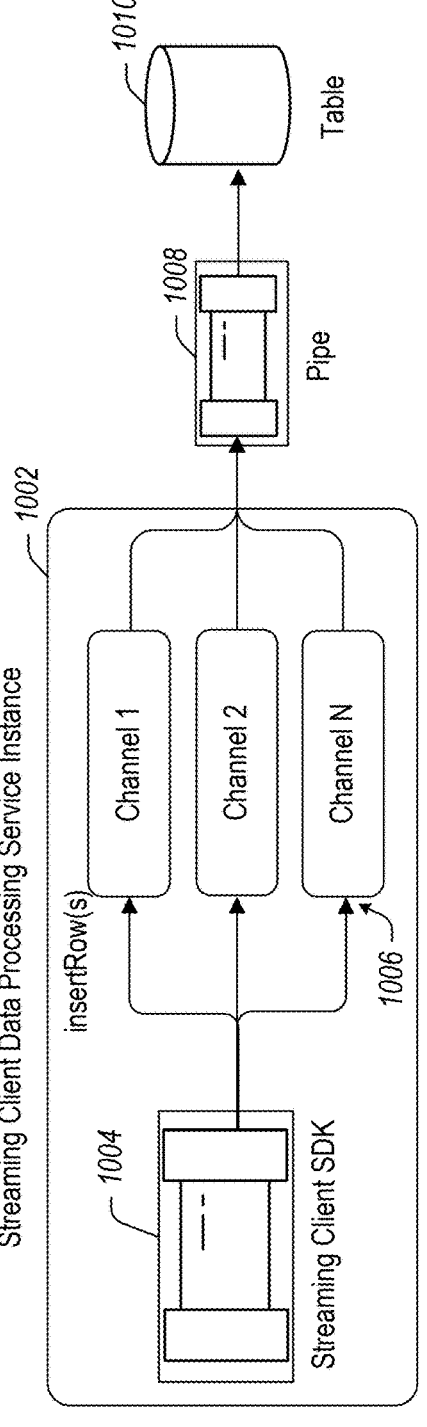
FIG. 10 is a block diagram of a streaming client of a data processing service configured to process streaming data, in accordance with some embodiments of the present disclosure.

FIG. 10 is a block diagram 1000 of a streaming client of a data processing service configured to process streaming data, in accordance with some embodiments of the present disclosure. Referring to FIG. 10, a data processing service instance can be configured as a streaming client data processing service instance 1002, which includes a streaming client software development kit (SDK) 1004. The streaming client SDK 1004 accepts rows over channels 1006 as inputs to a pipe 1008 (e.g., a data processing service instance). The streaming client SDK 1004 can be configured based on Python, Java, Go, etc.

Pipe 1008 can be configured to ingest data into a destination table 1010. Rows can be buffered in-memory for a short duration and then flushed to cloud storage in an intermediate file format (e.g., as an interleaved Parquet blob file). The blob file can be registered to a destination table. Once the blob is registered, it is available to query immediately, and there may be no DML restrictions on the table once the blob is made available to query.

In some aspects, data can be migrated in the background from the intermediate data representation (e.g., data configuration, file format, etc.) to a different (e.g., final) data representation depending on the destination table type. Even though this configuration enables high-throughput, low-latency ingestion, low-latency querying on clustered tables can be time-consuming.

The disclosed techniques can be used to improve the low-latency querying by configuring the clustering of data at ingest time. In some aspects, DPM 128 can configure a pipe (or data processing service instance) as a destination (and not a table as the destination). The pipe (e.g., pipe 1008) can point to the destination table 1010, and the pipe's definition (or syntax) can include instructions on how to transform (e.g., cluster) the data in-flight, before it is stored in the destination table 1010.

FIG. 11 is a diagram of an example data processing service definition 1100, configuring a data processing service to perform clustering at ingest time using a COPY command, in accordance with some embodiments of the present disclosure. Referring to FIG. 11, data processing service definition 1100 (also referred to as pipe definition 1100) creates the pipe as a COPY command into a destination table. The syntax of the COPY command can identify a stage where the incoming data is available (stored), and can also include a flag indicating whether clustering at ingest time is enabled (requested) or disabled (not requested).

In some aspects, DPM 128 configures a COPY command syntax as listed in Table 1 below, which includes a flag (e.g., CLUSTER_AT_INGEST_TIMES) with Boolean values indicating whether or not clustering at ingest time is enabled.

TABLE 1

COPY INTO <table>
FROM <stage>
CLUSTER_AT_INGEST_TIME=<TRUE | FALSE>

The clustering at ingest time can take effect when the underlying destination table is set up for auto-clustering. In some aspects, DPM 128 can obtain one or more clustering keys for (e.g., keys used for performing the clustering at ingest time) based on the destination table configuration. The destination table definition can specify clustering either by "Create table value(c1) cluster by c1" or "Alter table Cluster by (column_name)," which can be used as a clustering key for performing the clustering at ingest time.

In some aspects, the flag in the COPY command syntax can be a CLUSTER_AT_INGEST_TIME flag, which can be used to enable clustering of data before it is committed to the destination table. In some aspects, DPM 128 can determine the batch size to use for clustering such that the latency for ingestion is comparable to the latency of ingesting data without pre-clustering. In some aspects, the default value of the flag is FALSE.

In some aspects, the CLUSTER_AT_INGEST_TIME flag can be used in connection with streaming ingest pipes or Kafka pull-based pipes to allow customers to explicitly specify this additional option. If auto-clustering is enabled at runtime on an existing table, any new execution platform jobs that are created will use the new clustering plan.

In some aspects, DPM 128 can enable clustering and configure the continuous processing of batches of data, instead of processing full or partial files continuously. This configuration may be preferred because data will be sorted, and DPM 128 may not track row numbers for partial commits when those are moved around for sorting.

Figure 12:
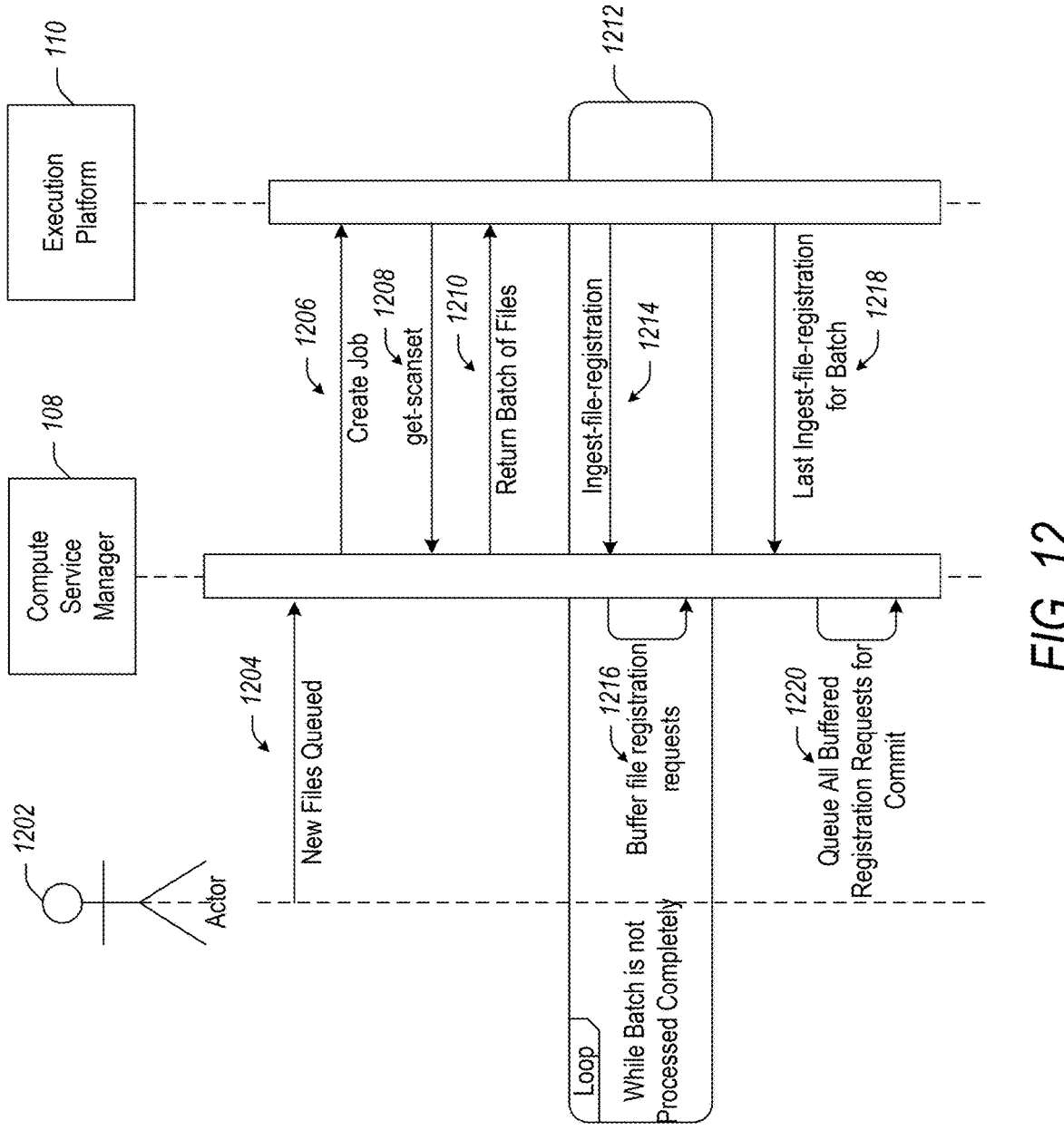
FIG. 12 is a diagram of an example communication exchange between a compute service manager and an execution platform in connection with performing clustering at ingest time, in accordance with some embodiments of the present disclosure.

FIG. 12 is a diagram of an example communication exchange 1200 between a compute service manager 108 and an execution platform 110 in connection with performing clustering at ingest time, in accordance with some embodiments of the present disclosure.

Figure 13:
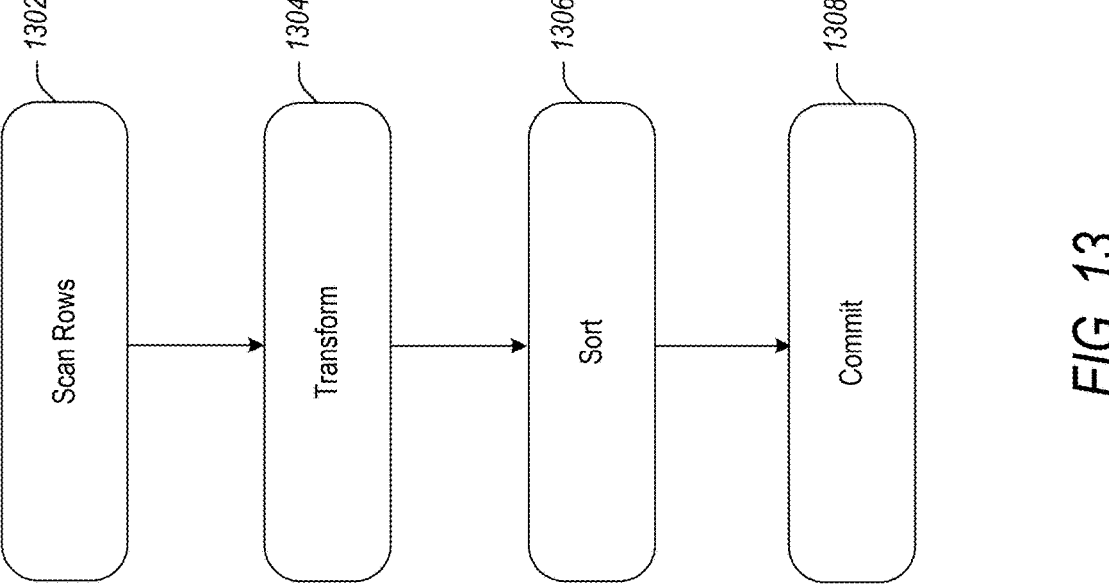
FIG. 13 is a flow diagram illustrating the operations of a database system in performing clustering at ingest time, in accordance with some embodiments of the present disclosure.

FIG. 13 is a flow diagram 1300 illustrating the operations of a database system in performing the clustering at ingest time, in accordance with some embodiments of the present disclosure.

Referring to FIG. 12 and FIG. 13, at operation 1204, user 1202 queues (uploads) new data (e.g., files or row data) in a stage. At operation 1206, DPM 128 (which can be configured at the compute service manager 108) creates an execution job for a node in the execution platform 110. This operation can also include communicating any clustering keys and data representation (e.g., file format) specifications associated with a destination table to the node in the execution platform 110.

At operation 1208, the node communicates a scanset to the compute service manager 108. At operation 1210 and operation 1302, the node in the execution platform 110 scans rows and obtains a batch of files from the compute service manager 108.

At operation 1212, the node initiates a processing loop to process (e.g., sequentially) each of the files in the obtained batch (e.g., to transform the data into the data representation (e.g., file format) compatible with the destination table and perform clustering based on the table clustering key (if clustering is enabled for the destination table)).

At operation 1304, the node transforms (e.g., sequentially) the files in the batch into a data representation (e.g., a file format) based on the obtained data representation (e.g., file format) specification of the destination table.

At operation 1306, the node in the execution platform 110 performs clustering (or sorting) of the data in the file based on the obtained clustering key associated with the destination table.

At operation 1214, the node communicates the processed file (e.g., via an ingest-file-registration API), which is buffered by the compute service manager 108 at operation 1216.

At operation 1218, the node in the execution platform 110 completes the processing loop for the batch and communicates the last processed file of the batch to the compute service manager 108.

At operation 1220, the compute service manager 108 queues all processed files (e.g., queues all buffered registration requests) for committing.

At operation 1308, the processed batch of files is committed to the destination table.

In some aspects, DPM 128 can configure the COPY command upon execution, to generate a new query plan that includes sorting/clustering (e.g., similar to the functionalities in flow diagram 1300). In some aspects, the COPY command will generate a new query plan based on a compiler parameter for tables that have an auto-clustering setup.

In some aspects, DPM 128 can identify the end of batch processing in the compute service manager 108 using the following two techniques:

(a) DPM 128 can track files in the compute service manager 108. The execution platform 110 can continue to send the completed (or partially completed) files via the ingest-file-registration API. The compute service manager 108 can track completed files in the current batch and identify when a batch is completed. This configuration can be used to perform the commit at operation 1308, clearing the way for a new batch to be given to the execution platform 110.

(b) Add a new signal in the execution platform 110 for end-of-batch indication. The execution platform 110 can send a new signal from the scanner that is accepted by an INSERT operator to indicate the end of the batch. The INSERT operator can either send a new property in the ingest-file-registration API that is invoked on the compute service manager 108 or use a new API to indicate to the compute service manager 108 that the batch has been processed successfully.

In some aspects, DPM 128 may not terminate the query plan until the batch is completed. The execution platform 110 can invoke a get-scanset API call on the compute service manager 108 to get more batch files. This API can remember whether a batch is in progress and can return an empty scanset (with continue=true) so that the execution platform job does not terminate itself. In some aspects, the execution platform can be configured to ensure that the query plan does not terminate on an empty scanset.

In some aspects, DPM 128 can be configured to perform batch file registration in the compute service manager 108. For example, an API can queue a registration request to a buffering registry. In some aspects, this API can buffer the incoming file registration requests until the end-of-batch notification is received from the execution platform 110. Upon receiving this notification, the buffered contents of this execution platform process can be queued for commit in a single request to ensure an atomic commit.

In some aspects, DPM 128 can perform clustering during the ingestion functionality. More specifically, DPM 128 can implement a buffering mechanism that accumulates incoming data until reaching an optimal batch size. DPM 128 then performs sorting according to pre-configured clustering keys that are defined within the destination table definitions. This process enables direct writing of data in an optimized (final) data representation (e.g., a file format) compatible with the destination table, eliminating the need for intermediate data representations (e.g., file formats). The functionality can be enabled through a specific COPY command flag (e.g., CLUSTER_AT_INGEST_TIME flag), providing users with explicit control over when to implement pre-clustering during the ingestion process.

In some aspects, DPM 128 is configured to perform batch processing management functionality, which introduces a comprehensive approach to handling data ingestion. Through the compute service manager 108, DPM 128 can maintain precise tracking of files within the current batch while buffering file registration requests until the entire batch is complete. This ensures data consistency through atomic commits of complete batches, with built-in safeguards preventing job termination until all batch processing is finished. DPM 128 coordinates these operations through interaction between the compute service manager and execution platform components, ensuring efficient and reliable data processing.

In some aspects, DPM 128 is configured to perform query optimization functionality, which can result in performance improvements through immediate data availability in a clustered format. DPM 128 can enable efficient data pruning during queries by organizing data according to clustering keys at ingestion time, allowing queries to skip scanning unnecessary files. This approach can improve query performance and can be applied to queries that filter on clustering columns such as time events, types, or tenants. The pre-clustered format ensures that data is immediately available for efficient querying without waiting for background clustering operations.

In some aspects, DPM 128 can perform resource management to optimize system operations by eliminating redundant processing steps. More specifically, DPM 128 can combine what were previously separate staging table and refine table operations while also skipping ingest garbage collection when clustering at ingest time is enabled. In this regard, data processing can occur through an optimized query plan that includes a dedicated sorting operator, ensuring efficient resource utilization throughout the ingestion process. This approach significantly reduces system overhead by eliminating redundant scan and write operations that were previously required for background clustering.

In some aspects, DPM 128 is configured with integration capabilities to ensure broad compatibility across different ingestion scenarios. More specifically, DPM 128 can configure clustering with batch file ingestion and streaming processes, supporting various data ingestion patterns. In some aspects, clustering can be configured at the table level through CREATE or ALTER table commands, with the flexibility to enable or disable clustering at runtime on existing tables. DPM 128 can be configured to process multiple data representations (e.g., file formats) and transform them into the optimized storage format, providing versatility in handling different data sources while maintaining consistent clustering benefits.

FIG. 14 is a flow diagram illustrating the operations of a database system in performing a method 1400 for ingesting data into a destination table, in accordance with some embodiments of the present disclosure. Method 1400 may be embodied in computer-readable instructions for execution by one or more hardware components (e.g., one or more processors) such that the operations of method 1400 may be performed by components of network-based database system 102, such as components of the compute service manager 108 (e.g., the DPM 128) and/or the execution platform 110 (which components may be implemented as machine 1500 of FIG. 15). Accordingly, method 1400 is described below, by way of example with reference to it. However, it should be noted that method 1400 may be deployed on various other hardware configurations and is not intended to be limited to deployment within the network-based database system 102.

At operation 1402, DPM 128 detects that a data processing pipeline definition includes a COPY command syntax. For example, DPM 128 examines the data processing pipeline definition to identify the presence of a COPY command syntax. This involves parsing the pipeline configuration to detect specific command structures that indicate a copy operation is requested. The COPY command can include special flags (e.g., a CLUSTER_AT_INGEST_TIME flag) to enable pre-clustering functionality during the ingestion process. DPM 128 validates that the command syntax is formatted correctly and contains all required parameters for execution.

At operation 1404, DPM 128 parses the COPY command syntax to determine a storage location and a destination table. For example, DPM 128 analyzes the COPY command syntax to extract the following pieces of information: the storage location where source files reside and the destination table where data will be ingested. This parsing process includes validating that the destination table exists and has the proper configuration for clustering, including checking for defined clustering keys in the table definition. DPM 128 also verifies that the necessary permissions and access rights are available for both the source location and the destination table.

At operation 1406, DPM 128 detects that a batch of files is available at the storage location. For example, DPM 128 monitors the specified storage location to identify when a batch of files becomes available for processing. This functionality includes tracking files in the current batch through the compute service manager. DPM 128 buffers incoming files until reaching a target batch size to optimize the clustering process.

At operation 1408, DPM 128 executes the COPY command to transform the batch into formatted files. The formatted files can be associated with a pre-configured data representation (e.g., a file format) compatible with the destination table. In some aspects, DPM 128 executes the COPY command to transform the batch of source files into a format compatible with the destination table. This transformation process involves the execution platform configuring a query plan that includes scanning rows and performing necessary transformations. DPM 128 ensures the output format matches the pre-configured data representation (e.g., a file format) requirements of the destination table, preparing the data for subsequent clustering operations.

At operation 1410, DPM 128 performs clustering on the formatted files to generate clustered files. For example, DPM 128 applies clustering operations to the formatted files based on the clustering keys defined in the table definition. This process involves executing a sort operator as part of the query plan to organize the data according to the specified clustering criteria. The execution platform processes the entire batch together, sorting the data efficiently before generating the final clustered files. DPM 128 can track the completion of clustering operations through notifications from computing node(s) performing the clustering.

At operation 1412, DPM 128 ingests the clustered files in the destination table. For example, DPM 128 performs the final ingestion of the clustered files into the destination table. This processing can include an atomic commit process to ensure data consistency. DPM 128 makes the clustered data immediately available for querying, enabling efficient data pruning during subsequent query operations. The ingestion process completes the pipeline execution while maintaining the clustered organization of the data, eliminating the need for background clustering operations.

Figure 15:
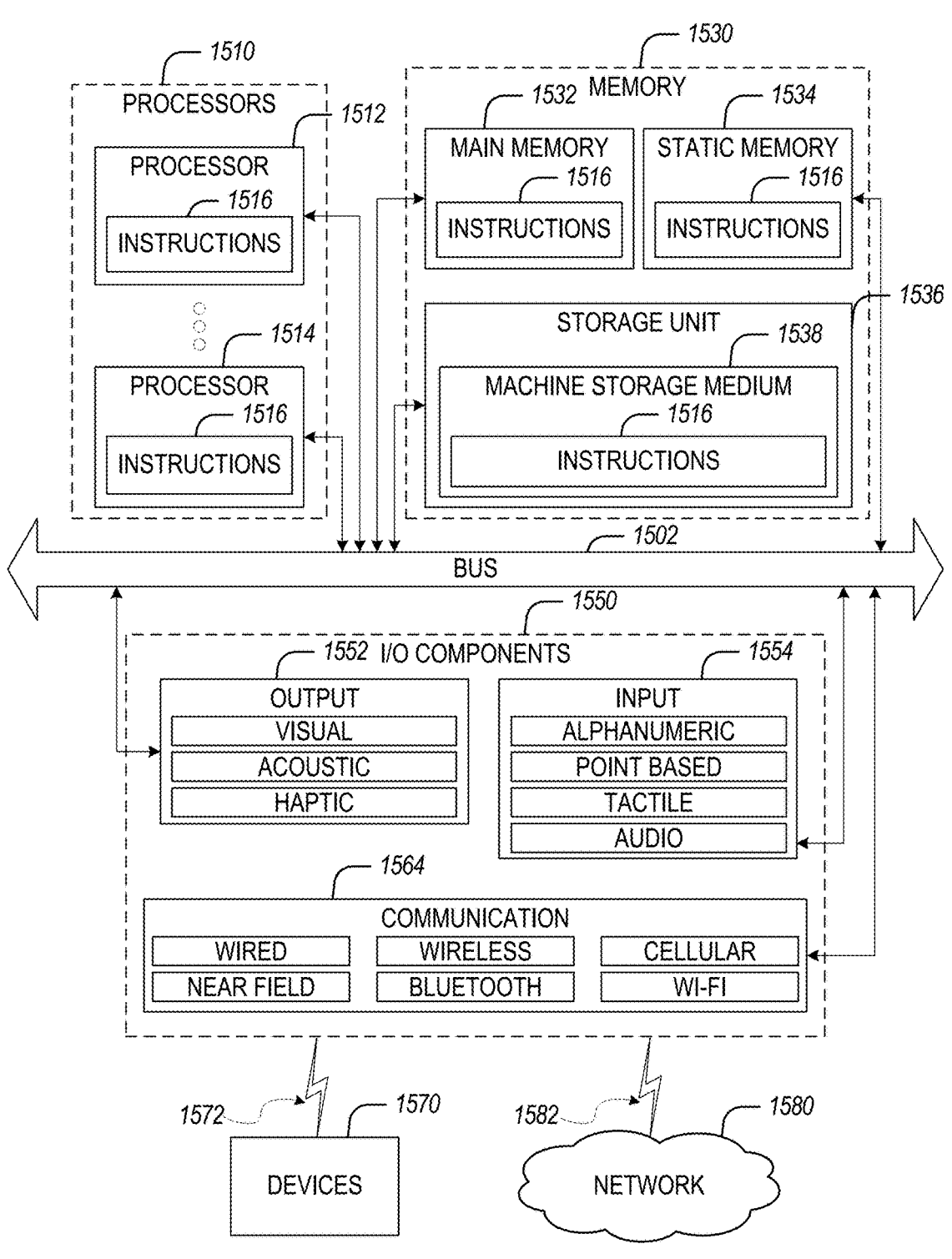
FIG. 15 illustrates a diagrammatic representation of a machine in the form of a computer system within which a set of instructions may be executed for causing the machine to perform any one or more of the methodologies discussed herein, in accordance with some embodiments of the present disclosure.

FIG. 15 illustrates a diagrammatic representation of a machine 1500 in the form of a computer system within which a set of instructions may be executed to cause the machine 1500 to perform any one or more of the methodologies discussed herein, according to an example embodiment. Specifically, FIG. 15 shows a diagrammatic representation of machine 1500 in the example form of a computer system, within which instructions 1516 (e.g., software, a program, an application, an applet, an app, or other executable code) for causing the machine 1500 to perform any one or more of the methodologies discussed herein may be executed. For example, instructions 1516 may cause machine 1500 to execute any one or more operations of method 1400 (or any other technique discussed herein, for example, in connection with FIG. 1-FIG. 13). As another example, instructions 1516 may cause machine 1500 to implement one or more portions of the functionalities discussed herein. In this way, instructions 1516 may transform a general, non-programmed machine into a particular machine 1500 (e.g., the compute service manager 108 or a node in the execution platform 110) that is specially configured to carry out any one of the described and illustrated functions in the manner described herein. In yet another embodiment, instructions 1516 may configure the compute service manager 108 and/or a node in the execution platform 110 to carry out any one of the described and illustrated functions in the manner described herein.

In alternative embodiments, the machine 1500 operates as a standalone device or may be coupled (e.g., networked) to other machines. In a networked deployment, machine 1500 may operate in the capacity of a server machine or a client machine in a server-client network environment or as a peer machine in a peer-to-peer (or distributed) network environment. The machine 1500 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

Machine 1500 includes processors 1510, memory 1530, and input/output (I/O) components 1550 configured to communicate with each other, such as via a bus 1502. In some example embodiments, the processors 1510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1512 and a processor 1514 that may execute the instructions 1516. The term "processor" is intended to include multi-core processors 1510 that may comprise two or more independent processors (sometimes referred to as "cores") that may execute instructions 1516 contemporaneously. Although FIG. 15 shows multiple processors 1510, machine 1500 may include a single processor with a single core, a single processor with multiple cores (e.g., a multi-core processor), multiple processors with a single core, multiple processors with multiple cores, or any combination thereof.

The memory 1530 may include a main memory 1532, a static memory 1534, and a storage unit 1536, all accessible to the processors 1510, such as via the bus 1502. The main memory 1532, the static memory 1534, and the storage unit 1536 store the instructions 1516, embodying any one or more of the methodologies or functions described herein. The instructions 1516 may also reside, wholly or partially, within the main memory 1532, within the static memory 1534, within machine storage medium 1538 of the storage unit 1536, within at least one of the processors 1510 (e.g., within the processor's cache memory), or any suitable combination thereof, during execution thereof by the machine 1500.

The I/O components 1550 include components to receive input, provide output, produce output, transmit information, exchange information, capture measurements, and so on. The specific I/O components 1550 that are included in a particular machine 1500 will depend on the type of machine. For example, portable machines such as mobile phones will likely include a touch input device or other such input mechanisms. In contrast, a headless server machine will likely not include such a touch input device. It will be appreciated that the I/O components 1550 may include many other components that are not shown in FIG. 15. The I/O components 1550 are grouped according to functionality merely to simplify the following discussion, and the grouping is in no way limiting. In various example embodiments, the I/O components 1550 may include output components 1552 and input components 1554. The output components 1552 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 1554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 1550 may include communication components 1564, operable to couple the machine 1500 to a network 1580 or devices 1570 via a coupling 1582 and a coupling 1572, respectively. For example, the communication components 1564 may include a network interface component or another suitable device to interface with the network 1580. In further examples, communication components 1564 may include wired communication components, wireless communication components, cellular communication components, and other communication components to provide communication via other modalities. The device 1570 may be another machine or any of a wide variety of peripheral devices (e.g., a peripheral device coupled via a universal serial bus (USB)). For example, as noted above, machine 1500 may correspond to any one of the compute service manager 108 or the execution platform 110, and device 1570 may include the client device 114 or any other computing device described herein as being in communication with the network-based database system 102 or the storage platform 104.

The various memories (e.g., 1530, 1532, 1534, and/or memory of the processor(s) 1510 and/or the storage unit 1536) may store one or more sets of instructions 1516 and data structures (e.g., software) embodying or utilized by any one or more of the methodologies or functions described herein. These instructions 1516, when executed by the processor(s) 1510, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database and/or associated caches and servers) that store executable instructions and/or data. The terms shall accordingly be taken to include, but not be limited to, solid-state memories and optical and magnetic media, including memory internal or external to processors. Specific examples of machine-storage media, computer-storage media, and/or device-storage media include non-volatile memory, including by way of example, semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such transitory media, at least some of which are covered under the term "signal medium" discussed below.

In various example embodiments, one or more portions of the network 1580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 1580 or a portion of network 1580 may include a wireless or cellular network, and coupling 1582 may be a Code Division Multiple Access (CDMA) connection, a Global System for Mobile communications (GSM) connection, or another type of cellular or wireless coupling. In this example, the coupling 1582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1516 may be transmitted or received over network 1580 using a transmission medium via a network interface device (e.g., a network interface component included in the communication components 1564) and utilizing any one of several well-known transfer protocols (e.g., hypertext transfer protocol (HTTP)). Similarly, instructions 1516 may be transmitted or received using a transmission medium via coupling 1572 (e.g., a peer-to-peer coupling) to device 1570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1516 for execution by the machine 1500 and includes digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some example embodiments, the processor or processors may be located in a single location (e.g., within a home environment, an office environment, or a server farm). In contrast, in other embodiments, the processors may be distributed across several locations.

Described implementations of the subject matter can include one or more features, alone or in combination, as illustrated below by way of examples.

Example 1 is a system comprising: at least one hardware processor; and at least one memory storing instructions that cause the at least one hardware processor to perform operations comprising: detecting a data processing pipeline definition comprises a COPY command syntax of a COPY command; parsing the COPY command syntax to determine a storage location and a destination table; detecting a batch of files is available at the storage location; executing the COPY command to transform the batch into formatted files, the formatted files being associated with a pre-configured file format compatible with the destination table; performing clustering on the formatted files to generate clustered files; and ingesting the clustered files in the destination table.

In Example 2, the subject matter of Example 1 includes the operations further comprising detecting the COPY command syntax, which comprises a flag indicating whether the clustering is authorized at ingest time, and performing the clustering based on the flag indicating that the clustering is authorized.

In Example 3, the subject matter of Example 2 includes the operations further comprising generating a query plan for the COPY command based on the flag indicating that the clustering is authorized, and the query plan including a sorting function.

In Example 4, the subject matter of Example 3 includes the operations further comprising: retrieving a table definition of the destination table, the table definition comprising a clustering key.

In Example 5, the subject matter of Example 4 includes the operations further comprising: executing the sorting function of the query plan based on the clustering key to perform the clustering.

In Example 6, the subject matter of Examples 1-5 includes the operations further comprising tracking the completion of the clustering for each of the formatted files; detecting a new batch of files is available at the storage location; and initiating execution of the COPY command for the new batch of files based on detecting the completion of the clustering for the last one of the formatted files.

In Example 7, the subject matter of Example 6 includes the operations further comprising: tracking the completion of the clustering based on a notification from a computing node performing the clustering.

In Example 8, the subject matter of Examples 1-7 includes the operations further comprising: retrieving a target batch size configuration for the destination table; and buffering the batch of files until reaching the target batch size before executing the COPY command.

In Example 9, the subject matter of Example 8 includes operations further comprising offloading execution of the COPY command to a computing node of an execution platform and transforming the batch into the formatted files in a processing loop executed at the computing node.

In Example 10, the subject matter of Example 9 includes the operations further comprising: performing the ingesting upon completion of the clustering on the formatted files.

Example 11 is a method comprising: detecting, by at least one hardware processor, a data processing pipeline definition comprises a COPY command syntax of a COPY command; parsing the COPY command syntax to determine a storage location and a destination table; detecting a batch of files is available at the storage location; executing the COPY command to transform the batch into formatted files, the formatted files being associated with a pre-configured format compatible with the destination table; performing clustering on the formatted files to generate clustered files; and ingesting the clustered files in the destination table.

In Example 12, the subject matter of Example 11 includes detecting the COPY command syntax comprises a flag indicating whether the clustering is authorized at ingest time, and performing the clustering based on the flag indicating that the clustering is authorized.

In Example 13, the subject matter of Example 12 includes generating a query plan for the COPY command based on the flag indicating that the clustering is authorized, the query plan including a sorting function.

In Example 14, the subject matter of Example 13 includes retrieving a table definition of the destination table, the table definition comprising a clustering key.

In Example 15, the subject matter of Example 14 includes executing the sorting function of the query plan based on the clustering key to perform the clustering.

In Example 16, the subject matter of Examples 11-15 includes tracking the completion of the clustering for each of the formatted files, detecting a new batch of files is available at the storage location, and initiating execution of the COPY command for the new batch of files based on detecting the completion of the clustering for the last one of the formatted files.

In Example 17, the subject matter of Example 16 includes tracking the completion of the clustering based on a notification from a computing node performing the clustering.

In Example 18, the subject matter of Examples 11-17 includes retrieving a target batch size configuration for the destination table and buffering the batch of files until it reaches the target batch size before executing the COPY command.

In Example 19, the subject matter of Example 18 includes offloading execution of the COPY command to a compute node of an execution platform, and transforming the batch into the formatted files in a processing loop executed at the compute node.

In Example 20, the subject matter of Example 19 includes performing the ingesting upon completion of the clustering on the formatted files.

Example 21 is a computer-storage medium comprising instructions that, when executed by one or more processors of a machine, configure the machine to perform operations comprising: detecting a data processing pipeline definition comprises a COPY command syntax of a COPY command; parsing the COPY command syntax to determine a storage location and a destination table; detecting a batch of files is available at the storage location; executing the COPY command to transform the batch into formatted files, the formatted files being associated with a pre-configured format compatible with the destination table; performing clustering on the formatted files to generate clustered files; and ingesting the clustered files in the destination table.

In Example 22, the subject matter of Example 21 includes functionalities such as detecting the COPY command syntax, which comprises a flag indicating whether the clustering is authorized at ingest time, and performing the clustering based on the flag indicating that the clustering is authorized.

In Example 23, the subject matter of Example 22 includes functionalities such as generating a query plan for the COPY command based on the flag indicating that the clustering is authorized, and the query plan includes a sorting function.

In Example 24, the subject matter of Example 23 includes functionalities such as retrieving a table definition of the destination table, the table definition comprising a clustering key.

In Example 25, the subject matter of Example 24 includes functionalities such as executing the sorting function of the query plan based on the clustering key to perform clustering.

In Example 26, the subject matter of Examples 21-25 includes functionalities such as tracking completion of the clustering for each of the formatted files; detecting a new batch of files is available at the storage location; and initiating execution of the COPY command for the new batch of files based on detecting the completion of the clustering for a last one of the formatted files.

In Example 27, the subject matter of Example 26 includes functionalities such as tracking the completion of the clustering based on a notification from a computing node performing the clustering.

Example 28 is at least one machine-readable medium including instructions that, when executed by processing circuitry, cause the processing circuitry to perform operations to implement any of Examples 1-27.

Example 29 is an apparatus comprising means to implement any of Examples 1-27.

Example 30 is a system to implement any of Examples 1-27.

Example 31 is a method to implement any of Examples 1-27.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually, and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments and other embodiments not explicitly described herein will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
at least one hardware processor; and
at least one memory storing instructions that cause the at least one hardware processor to perform operations comprising:
detecting a data processing pipeline definition comprises a COPY command syntax of a COPY command;
parsing the COPY command syntax to determine a storage location and a destination table;
detecting a batch of files is available at the storage location;
executing the COPY command to transform the batch into formatted files, the formatted files being associated with a pre-configured file format compatible with the destination table;
performing clustering on the formatted files to generate clustered files; and
ingesting the clustered files in the destination table, the ingesting comprising:
invoking a registration application programming interface (API) to register the clustered files as registered clustered files; and
responsive to an end-of-batch indication, atomically committing the registered clustered files as a single transaction in a storage format of the destination table without generating intermediate data representations.

2. The system of claim 1, the operations further comprising:

detecting the COPY command syntax comprises a flag indicating whether the clustering is authorized at ingest time; and performing the clustering based on the flag indicating that the clustering is authorized.

3. The system of claim 2, the operations further comprising:

generating a query plan for the COPY command based on the flag indicating that the clustering is authorized, the query plan including a sorting function.

4. The system of claim 3, the operations further comprising:

retrieving a table definition of the destination table, the table definition comprising a clustering key.

5. The system of claim 4, the operations further comprising:

executing the sorting function of the query plan based on the clustering key to perform the clustering.

6. The system of claim 1, the operations further comprising:

tracking completion of the clustering for each of the formatted files;

detecting a new batch of files is available at the storage location; and initiating execution of the COPY command for the new batch of files based on detecting the completion of the clustering for a last one of the formatted files.

7. The system of claim 6, the operations further comprising:

tracking the completion of the clustering based on a notification from a computing node performing the clustering.

8. The system of claim 1, the operations further comprising:

retrieving a target batch size configuration for the destination table; and buffering the batch of files until reaching the target batch size before executing the COPY command.

9. The system of claim 8, the operations further comprising:

offloading execution of the COPY command to a computing node of an execution platform; and transforming the batch into the formatted files in a processing loop executed at the computing node.

10. The system of claim 9, the operations further comprising:

performing the ingesting upon completion of the clustering on the formatted files.

11. A method comprising:

detecting, by at least one hardware processor, a data processing pipeline definition comprises a COPY command syntax of a COPY command;

parsing the COPY command syntax to determine a storage location and a destination table;

detecting a batch of files is available at the storage location;

executing the COPY command to transform the batch into formatted files, the formatted files being associated with a pre-configured format compatible with the destination table;

performing clustering on the formatted files to generate clustered files; and ingesting the clustered files in the destination table, the ingesting comprising:

invoking a registration application programming interface (API) to register the clustered files as registered clustered files; and responsive to an end-of-batch indication, atomically committing the registered clustered files as a single transaction in a storage format of the destination table without generating intermediate data representations.

12. The method of claim 11, further comprising:

detecting the COPY command syntax comprises a flag indicating whether the clustering is authorized at ingest time; and performing the clustering based on the flag indicating that the clustering is authorized.

13. The method of claim 12, further comprising:

generating a query plan for the COPY command based on the flag indicating that the clustering is authorized, the query plan including a sorting function.

14. The method of claim 13, further comprising:

retrieving a table definition of the destination table, the table definition comprising a clustering key.

15. The method of claim 14, further comprising:

executing the sorting function of the query plan based on the clustering key to perform the clustering.

16. The method of claim 11, further comprising:

tracking completion of the clustering for each of the formatted files;

detecting a new batch of files is available at the storage location; and initiating execution of the COPY command for the new batch of files based on detecting the completion of the clustering for a last one of the formatted files.

17. The method of claim 16, further comprising:

tracking the completion of the clustering based on a notification from a computing node performing the clustering.

18. The method of claim 11, further comprising:

retrieving a target batch size configuration for the destination table; and buffering the batch of files until reaching the target batch size before executing the COPY command.

19. The method of claim 18, further comprising:

offloading execution of the COPY command to a compute node of an execution platform; and transforming the batch into the formatted files in a processing loop executed at the compute node.

20. The method of claim 19, further comprising:

performing the ingesting upon completion of the clustering on the formatted files.

21. A computer-storage medium comprising instructions that, when executed by one or more processors of a machine, configure the machine to perform operations comprising:

detecting a data processing pipeline definition comprises a COPY command syntax of a COPY command;

parsing the COPY command syntax to determine a storage location and a destination table;

detecting a batch of files is available at the storage location;

executing the COPY command to transform the batch into formatted files, the formatted files being associated with a pre-configured format compatible with the destination table;

performing clustering on the formatted files to generate clustered files; and ingesting the clustered files in the destination table, the ingesting comprising:

invoking a registration application programming interface (API) to register the clustered files as registered clustered files; and responsive to an end-of-batch indication, atomically committing the registered clustered files as a single transaction in a storage format of the destination table without generating intermediate data representations.

22. The computer-storage medium of claim 21, the operations comprising:

detecting the COPY command syntax comprises a flag indicating whether the clustering is authorized at ingest time; and performing the clustering based on the flag indicating that the clustering is authorized.

23. The computer-storage medium of claim 22, the operations comprising:

generating a query plan for the COPY command based on the flag indicating that the clustering is authorized, the query plan including a sorting function;

retrieving a table definition of the destination table, the table definition comprising a clustering key; and executing the sorting function of the query plan based on the clustering key to perform the clustering.

24. The computer-storage medium of claim 21, the operations comprising:

tracking completion of the clustering for each of the formatted files;

detecting a new batch of files is available at the storage location; and initiating execution of the COPY command for the new batch of files based on detecting the completion of the clustering for a last one of the formatted files.

25. The computer-storage medium of claim 24, the operations comprising:

tracking the completion of the clustering based on a notification from a computing node performing the clustering.

* * * * *